(12) United States Patent
Obana

(10) Patent No.: US 8,397,142 B2
(45) Date of Patent: Mar. 12, 2013

(54) SHARED INFORMATION GENERATING APPARATUS AND RECOVERING APPARATUS

(75) Inventor: Satoshi Obana, Tokyo (JP)

(73) Assignee: NEC Corporation, Tokyo (JP)

( * ) Notice: Subject to any disclaimer, the term of this patent is extended or adjusted under 35 U.S.C. 154(b) by 992 days.

(21) Appl. No.: 12/447,095

(22) PCT Filed: Sep. 5, 2007

(86) PCT No.: PCT/JP2007/067278
§ 371 (c)(1),
(2), (4) Date: Apr. 24, 2009

(87) PCT Pub. No.: WO2008/050544
PCT Pub. Date: May 2, 2008

(65) Prior Publication Data
US 2010/0031128 A1 Feb. 4, 2010

(30) Foreign Application Priority Data

Oct. 24, 2006 (JP) ................................ 2006-288911

(51) Int. Cl.
*G06F 11/00* (2006.01)
(52) U.S. Cl. ........................................................ 714/784
(58) Field of Classification Search ................... 714/784
See application file for complete search history.

(56) References Cited

FOREIGN PATENT DOCUMENTS

| JP | 1996204696 A | 8/1996 |
|---|---|---|
| JP | 2000214774 A | 8/2000 |
| JP | 2004274320 A | 9/2004 |
| JP | 2005128592 A | 5/2005 |
| JP | 2005141436 A | 6/2005 |

OTHER PUBLICATIONS

Ogata et al., "t-Cheater Identifiable (k, n) Threshold Secret Sharing Schemes", CRYPTO'95, LNCS 963, p. 410-423, 1995.*
Sarwate et al., "On Sharing Secrets and Reed-Solomon Codes", Communications of the ACM, vol. 24, No. 9, p. 583-584, Sep. 1981.*
International Search Report for PCT/JP2007/067278 mailed Dec. 4, 2007.
A. Shamir, "How to Share a Secret", Communications of the ACM, vol. 22, No. 11, Nov. 1979, p. 612-613.
M. Tompa et al., "How to Share a Secret with Cheaters", Journal of Cryptology, p. 133-138, 1988.
W. Ogata, et al., "Optimum Secret Sharing Scheme Secure Against Cheating", Society for Industrial and Applied Mathematics, vol. 20, No. 1, p. 79-95, 2006.
T. Rabin et al., "Verifiable Secret Sharing and Multiparty Protocols with Honest Majority", ACM, p. 73-85, 1989.
K. Kurosawa et al., "t-Cheater Identifiable (k, n) Threshold Secret Sharing Schemes", CRYPTO'95, LNCS 963, p. 410-423, 1995.

* cited by examiner

*Primary Examiner* — Scott Baderman
*Assistant Examiner* — Jigar Patel

(57) ABSTRACT

There is disclosed a system for identifying falsified secret information shares included in k secret information shares used to recover secret information according to a (k,n)-threshold secret sharing scheme, and producing falsified secret information shares of reduced size. A shared information generating apparatus generates cheater identifying information Ai(i=1, 2, . . . , n) using n secret information shares Vi generated according to the (k,n)-threshold secret sharing scheme and random polynomials. A recovering apparatus detects cheated secret information shares using the arbitrary k secret information shares and k cheater identifying information, and recovers the secret information from the k secret information shares if it detects no cheated secret information shares.

14 Claims, 12 Drawing Sheets

SHARED INFORMATION GENERATING APPARATUS AND RECOVERING APPARATUS

TECHNICAL FIELD

The present invention relates to a shared information generating apparatus and recovering apparatus for sharing and managing secret information safely.

BACKGROUND ART

There is known a cryptographic technology called a secret sharing scheme for splitting secret information into a plurality of secret information shares and recovering the secret information only if the predetermined secret information shares are put together. The most famous of the available secret sharing schemes is a (k,n)-threshold secret sharing scheme (see Ad Shamir, "How to share a secret", Comm. ACM, 22(11), 612-613 (1979) (hereinafter referred to as Document 1).

According to the (k,n)-threshold secret sharing scheme, the secret information is split into n secret information shares. The secret information can be recovered if k out of the n secret information shares are put together. The secret information cannot be recovered or any information about the secret information cannot be obtained from less than k secret information shares.

The (k,n)-threshold secret sharing scheme disclosed in Document 1 has not taken into account a cheating of persons who manage secret information shares and failures of apparatus which mange secret information shares. When an attempt is made to retrieve the secret information by merging the k secret information shares, if they include even one secret information share which is different from the original secret information shares, then the secret information cannot properly be recovered or the fact that the original secret information has not properly been recovered cannot be detected.

Martin Tompa, Heather Woll, "How to Share a Secret with Cheaters", Journal of Cryptology, vol. 1, pages 133-138, 1988 (hereinafter referred to as Document 2), or Wakaha Ogata, Kaoru Kurosawa, Douglas R. Stinson, "Optimum Secret Sharing Scheme Secure Against Cheating", SIAM Journal on Discrete Mathematics, vol. 20, no. 1, pages 79-95, 2006 (hereinafter referred to as Document 3) discloses a technology for detecting the fact that original secret information has not properly been recovered when an attempt is made to retrieve the secret information by merging k secret information shares including (k−1) falsified secret information shares. However, the technology disclosed in Document 2 or Document 3 fails to identify the falsified secret information shares, though it can detect the fact that the falsified secret information shares are included.

T. Rabin and M. Ben-Or, "Verifiable Secret Sharing and Multiparty Protocols with Honest Majority", Proc. STOC '89, pp. 73-85, 1989 (hereinafter referred to as Document 4) or K. Kurosawa, S. Obana and W. Ogata, "t-Cheater Identifiable (k,n) Secret Sharing Schemes", Proc. Crypto '95, Lecture Notes in Computer Science, vol. 963, Springer Verlag, pp. 410-423, 1995 (hereinafter referred to as Document 5) discloses a technology for identifying falsified secret information shares when secret information shares used to recover secret information include the falsified secret information shares.

According to the technology disclosed in Document 4, all t falsified secret information shares can be identified with high probability if number t of falsified secret information shares satisfies k≧2t+1 in the (k,n)-threshold secret sharing scheme.

According to the technology disclosed in Document 5, all t falsified secret information shares can be identified with high probability if number t of falsified secret information shares satisfies k≧3t+1, and the size of the secret information shares is smaller than the size of the secret information shares disclosed in Document 4.

DISCLOSURE OF THE INVENTION

According to the technology disclosed in Document 4, however, if the secret has bit length L, then the secret information shares have a large size of (3n−2)L. According to the technology disclosed in Document 5, if the secret has bit length L, then the secret information shares also have a very large size of L+(t+2)/ε bits (ε represents the probability that a cheater will not be identified.

It is an object of the present invention to provide a secret information sharing system, a shared information generating apparatus, and a recovery apparatus which make it possible to identify falsified secret information shares and to have falsified secret information shares of reduced size when k secret information shares used to recover secret information include falsified information in the (k,n)-threshold secret sharing scheme.

To achieve the above objects, in accordance with the present invention, a secret information sharing system for splitting secret information into a plurality of secret information shares according to a (k,n)-threshold secret sharing scheme and managing the secret information shares, comprises:

a shared information generating apparatus that generates n secret information shares Vi(i=1, 2, . . . , n) from the secret information according to the (k,n)-threshold secret sharing scheme, and generates cheater identifying information Ai(i=1, 2, n), which makes it possible to detect and correct the errors according to a Reed-Solomon error-correcting process if t or less secret information shares of arbitrary k secret information shares V{i_j} (j=1, 2, . . . , k) have errors, in association with the n secret information shares Vi, using the generated n secret information shares Vi and random t-th polynomials where t represents an assumed number of cheated secret information shares which satisfies prescribed condition associated with a threshold value k; and a recovering apparatus that performs the Reed-Solomon error-correcting process on the arbitrary k secret information shares V{i_j} (j=1, 2, . . . , k) of the secret information shares generated by the shared information generating apparatus and k cheater identifying information Ai{i_j} (j=1, 2, . . . , k) corresponding thereto, determines whether each of the secret information shares V{i_j} is a cheated secret information share or not, and recovers the secret information from the k secret information shares V{i_j} if no cheated secret information share is detected.

In accordance with the present invention, a shared information generating apparatus for splitting secret information into a plurality of secret information shares according to a (k,n)-threshold secret sharing scheme, comprises:

a secret information sharing device that generates n secret information shares Vi(i=1, 2, . . . , n) from the secret information according to the (k,n)-threshold secret sharing scheme; and a cheater identifying information generating device that generates cheater identifying information Ai(i=1, 2, . . . , n), which makes it possible to detect and correct the errors according to a Reed-Solomon error-correcting process if t or less secret information shares of arbitrary k secret information shares V{i_j} (j=1, 2, ..., k) have errors, in association with the n secret information shares Vi, using the n secret information shares Vi generated by the secret information sharing device and random t-th polynomials where t represents a value which satisfies prescribed condition associated with a threshold value k.

In accordance with the present invention, a recovering apparatus for recovering secret information from a plurality of secret information shares generated according to a (k,n)-threshold secret sharing scheme by the above shared information generating apparatus, comprises:

a cheater identifying device that performs a Reed-Solomon error-correcting process on arbitrary k secret information shares V{i_j} (j=1, 2, ..., k) of the secret information shares generated by the shared information generating apparatus and k cheater identifying information Ai{i_j} (j=1, 2, ..., k) corresponding thereto; and a secret information recovering device that recovers the secret information from the k secret information shares V{i_j} if the cheater identifying device detects no errors.

In accordance with the present invention, another secret information sharing system for splitting secret information into a plurality of secret information shares according to a (k,n)-threshold secret sharing scheme and managing the secret information shares, comprises:

a shared information generating apparatus that generates n secret information shares Vi(i=1, 2, ..., n) from the secret information according to the (k,n)-threshold secret sharing scheme, and generates cheater identifying information Ai(i=1, 2, ..., n) corresponding to the n secret information shares Vi by using values produced by predetermined check condition equations as the cheater identifying information Ai corresponding to the secret information shares Vi, using the generated n secret information shares Vi, random data, and random (t−1) th polynomials where t represents an assumed number of cheated secret information shares which satisfies prescribed condition associated with a threshold value k; and a recovering apparatus that determines whether the check condition equations are satisfied or not using arbitrary k secret information shares V{i_j} (j=1, ..., k) of the secret information shares generated by the shared information generating apparatus and k cheater identifying information Ai{i_j} (j=1, 2, ..., k) corresponding thereto, determines whether each of the k secret information shares V{i_j} is a cheated secret information share or not based on the determined result as to whether the check condition equations are satisfied or not, and recovers the secret information from the k secret information shares V{i_j} if all the k secret information shares V{i_j} are not cheated secret information shares.

In accordance with the present invention, another shared information generating apparatus for splitting secret information into a plurality of secret information shares according to a (k,n)-threshold secret sharing scheme, comprises:

a secret information sharing device that generates n secret information shares Vi(i=1, 2, ..., n) from the secret information according to the (k,n)-threshold secret sharing scheme; and a cheater identifying information generating device that generates cheater identifying information Ai(i=1, 2, ..., n) corresponding to the n secret information shares Vi by using values produced by predetermined check condition equations as the cheater identifying information Ai corresponding to the secret information shares Vi, using the n secret information shares Vi generated by the secret information sharing device, random data, and random (t−1)th polynomials where t represents an assumed number of cheated secret information shares which satisfies prescribed condition associated with a threshold value k.

In accordance with the present invention, another recovering apparatus for recovering secret information from a plurality of secret information shares generated according to a (k,n)-threshold secret sharing scheme by the above shared information generating apparatus, comprising:

a cheater identifying device that determines whether the check condition equations are satisfied or not using arbitrary k secret information shares V{i_j} (j=1, 2, ..., k) of the secret information shares generated by the shared information generating apparatus and k cheater identifying information Ai{i_j} (j=1, 2, ..., k) corresponding thereto, and determines whether each of the k secret information shares V{i_j} is a cheated secret information share or not based on the determined result as to whether the check condition equations are satisfied or not; and a secret information recovering device that recovers the secret information from the k secret information shares V{i_j} if all the k secret information shares V{i_j} are not cheated secret information shares.

BEST MODE FOR CARRYING OUT THE INVENTION

An exemplary embodiment of the present invention will be described in detail below with reference to the drawings.

Figure 1:
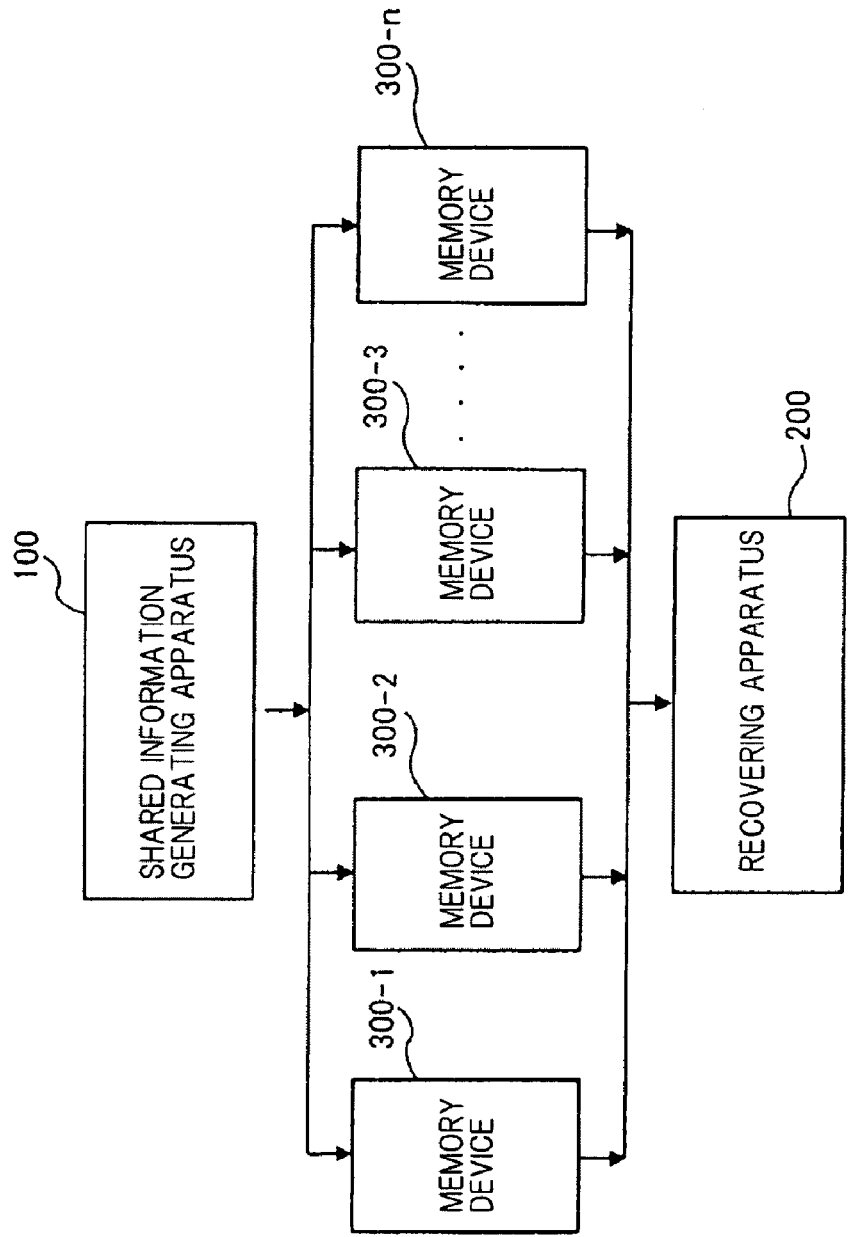
FIG. 1 is a block diagram of the configuration of a secret information sharing system according to an exemplary embodiment of the present invention.

FIG. 1 is a block diagram of the configuration of a secret information sharing system according to an exemplary embodiment of the present invention. As shown in FIG. 1, the secret information sharing system comprises shared information generating apparatus 100, recovering apparatus 200, and memory devices 300-1 ... 300-n.

The secret information sharing system has two phases of operation. One phase of operation is a phase for holding secret information, and the other phase of operation is a phase for recovering secret information.

Shared information generating apparatus 100 mainly operates in the phase for holding secret information, and recovering apparatus 200 mainly operates in the phase for recovering secret information.

In the phase for holding secret information, shared information generating apparatus 100 encodes secret information into a plurality of secret information shares according to threshold value k and total number n of information shares that are input as parameters, and stores the secret information shares respectively in memory devices 300-1 ... 300-n. Using the generated secret information shares and an assumed number of cheaters that is input as a parameter, shared information generating apparatus 100 generates cheater identifying information for the respective secret information shares, and stores the cheater identifying information in memory devices 300-1 ... 300-n where the corresponding secret information shares are stored. The assumed number of cheaters means an upper-limit number of assumed cheaters. The secret information sharing system according to the present invention can identify falsified secret information shares if the number of falsified secret information shares is up to the assumed number of cheaters. The cheater identifying information serves as data for identifying the falsified secret information shares. The falsified secret information shares which are typically illustrated herein should cover not only intentionally falsified secret information shares, but also secret information shares which have changed to fraudulent secret information shares for some reasons.

In the phase for recovering secret information, recovering apparatus 200 performs a process of reading a number k of secret information shares which is represented by threshold value k and the cheater identifying information from memory devices 300-1 ... 300-n, and identifying falsified secret information shares except for the secret information shares and the cheater identifying information. In the process of identifying falsified secret information shares, recovering apparatus 200 determines whether falsification has occurred or not and identifies falsified secret information shares if falsification has occurred. If the k secret information shares include no falsified secret information shares, then recovering apparatus 200 recovers the secret information from the k secret information shares.

Figure 2:
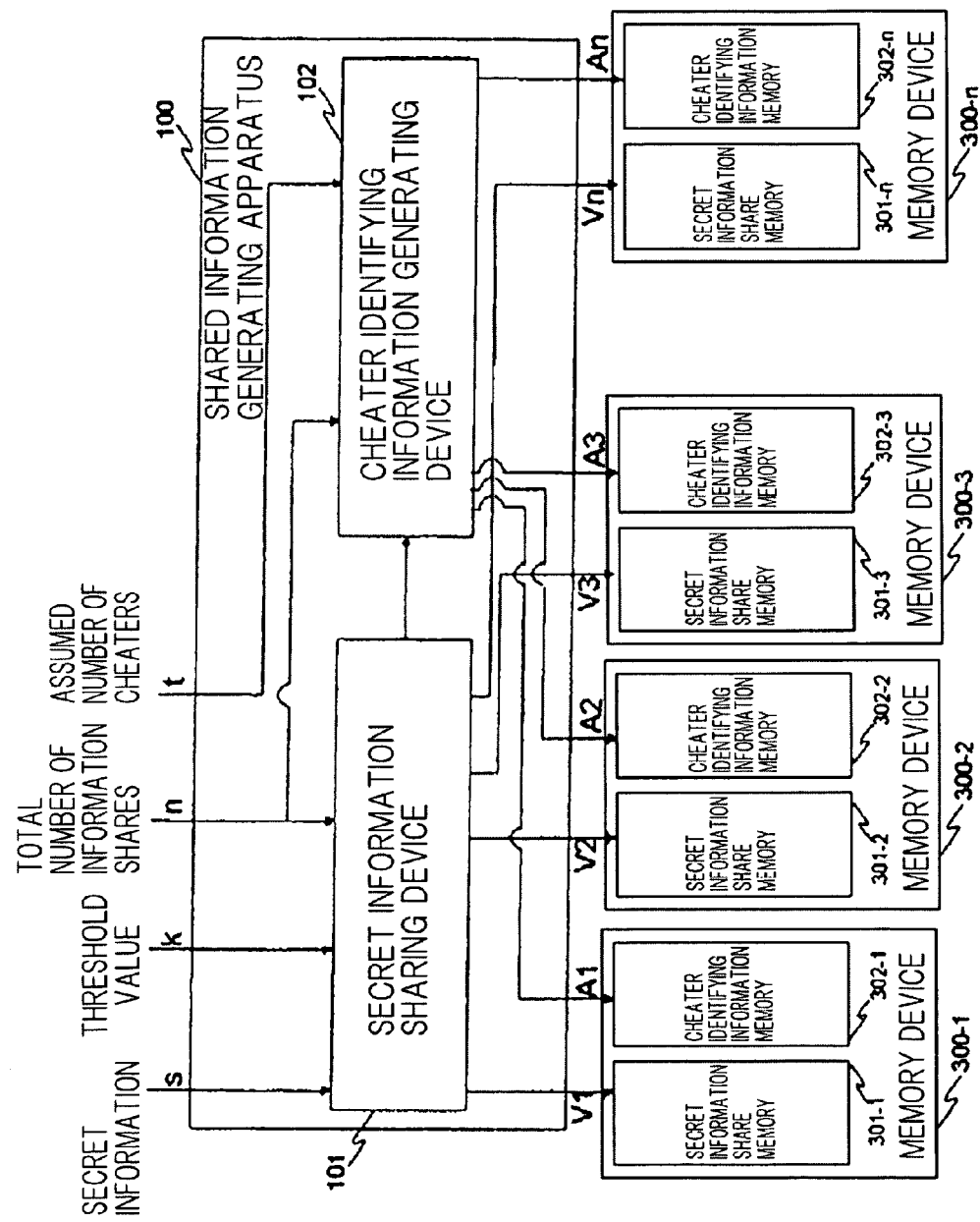
FIG. 2 is a block diagram of the configuration of shared information generating apparatus 100.

FIG. 2 is a block diagram of the configuration of shared information generating apparatus 100. As shown in FIG. 2, shared information generating apparatus 100 comprises secret information sharing device 101 and cheater identifying information generating device 102. Memory devices 300-1 ... 300-n have respective secret information share memories 301-1 ... 301-n and cheater identifying information memories 302-1 ... 302-n. Secret information share memories 301-1 ... 301-n store the respective secret information shares generated by shared information generating apparatus 100. Cheater identifying information memories 302-1 ... 302-n store the respective cheater identifying information generated by shared information generating apparatus 100. Secret information s which is handled in the present exemplary embodiment refers to the elements of a set of particular secret information.

Shared information generating apparatus 100 is supplied with secret information s, threshold value k, total number n of information shares, and assumed number t of cheaters. Shared information generating apparatus 100 generates and stores secret information shares v1 ... vn in secret information share memories 301-1 ... 301-n, and generates and stores cheater identifying information A1 ... An in cheater identifying information memories 302-1 ... 302-n.

Secret information sharing device 101 is supplied with secret information s, threshold value k, and total number n of information shares. Secret information sharing device 101 generates n secret information shares $v_i$ (i=1, 2, ..., n) using secret information s, threshold value k, and total number n of information shares, and stores generated n secret information shares vi in secret information share memories 301-i of corresponding memory devices 300-i.

Cheater identifying information generating device 102 is supplied with assumed number t of cheaters and total number n of information shares, and n secret information shares $v_i$ (i=1, 2, ..., n) from secret information sharing device 101. Cheater identifying information generating device 102 generates cheater identifying information Ai corresponding to n secret information shares $v_i$ (i=1, 2, ..., n) using assumed number t of cheaters, total number n of information shares, and n secret information shares vi, and stores cheater identifying information Ai in cheater identifying information memories 302-i of corresponding memory devices 300-i.

Figure 3:
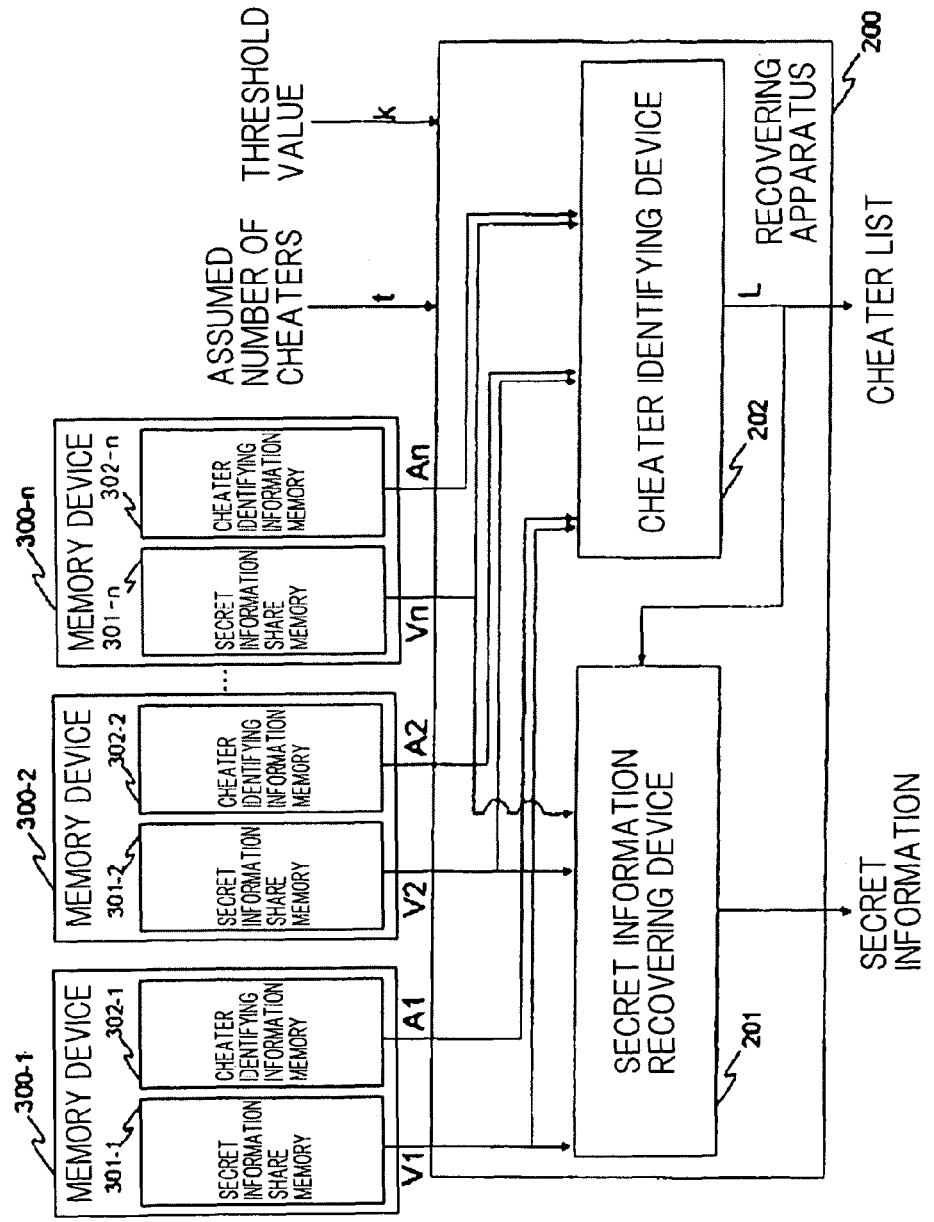
FIG. 3 is a block diagram of the configuration of recovering apparatus 200.

FIG. 3 is a block diagram of the configuration of recovering apparatus 200. As shown in FIG. 3, recovering apparatus 200 comprises secret information recovering device 201 and cheater identifying device 202.

Recovering apparatus 200 is supplied with threshold value k and assumed number t of cheaters. Recovering apparatus 200 reads secret information shares v{i_1} ... v{i_k} from secret information share memories 301-i_1 ... 301-i_k of k memory devices 300-i_1 ... 300-i_k of memory devices 300-1 ... 300-n. Recovering apparatus 200 also reads cheater identifying information A{i_1} ... A{i_k} from cheater identifying information memories 302-i_1 ... 302-i_k of memory devices 300-i_1 ... 300-i_k.

Recovering apparatus 200 performs a process for identifying falsified secret information shares using secret information shares v{i_1} ... v{i_k} and cheater identifying information A{i_1} ... A{i_k}. If there are falsified secret information shares, then recovering apparatus 200 outputs a symbol indicating that falsification is detected and a set of elements representing identifiers of cheaters (or the falsified secret information shares). If there are no falsified secret information shares, then recovering apparatus 200 recovers the secret information using secret information shares v{i_1} ... v{i_k}, and outputs the recovered secret information and an empty set indicating that there is no falsification.

Cheater identifying device 202 reads secret information shares v{i_1} ... v{i_k} and A{i_1} ... A{i_k} from secret information share memories 301-i_1 ... 301-i_k and cheater identifying information memories 302-i_1 ... 302-i_k of k memory devices 300-i_1 ... 300-i_k of memory devices 300-1 ... 300-n, and performs a process for identifying falsified secret information shares. If falsification is detected, then cheater identifying device 202 outputs a set of elements representing identifiers of cheaters. If no falsification is detected, then cheater identifying device 202 outputs an empty set indicating that there are no cheaters. Set (cheater list) L output from cheater identifying device 202 is output from recovering apparatus 200 and sent to secret information recovering device 201.

Secret information recovering device 201 reads secret information shares v{i_1} ... v{i_k} from secret information share memories 301-i_1 ... 301-i_k of k memory devices 300-i_1 ... 300-i_k that are shared by cheater identifying device 202. Only when set L is an empty set, secret information recovering device 201 performs a process of recovering the secret information, and outputs the recovered secret information. If set L is not an empty set, secret information recovering device 201 outputs a symbol indicating that falsification is detected instead of the secret information.

Shared information generating apparatus 100 shown in FIG. 2 and recovering apparatus 200 shown in FIG. 3 can be implemented by an integrated semiconductor circuit such as an LSI (Large Scale Integration) circuit, a DSP (Digital Signal Processor), or the like which is made up of logic circuits, etc., for example. Shared information generating apparatus 100 and recovering apparatus 200 can also be implemented by a computer which executes programs.

Figure 4:
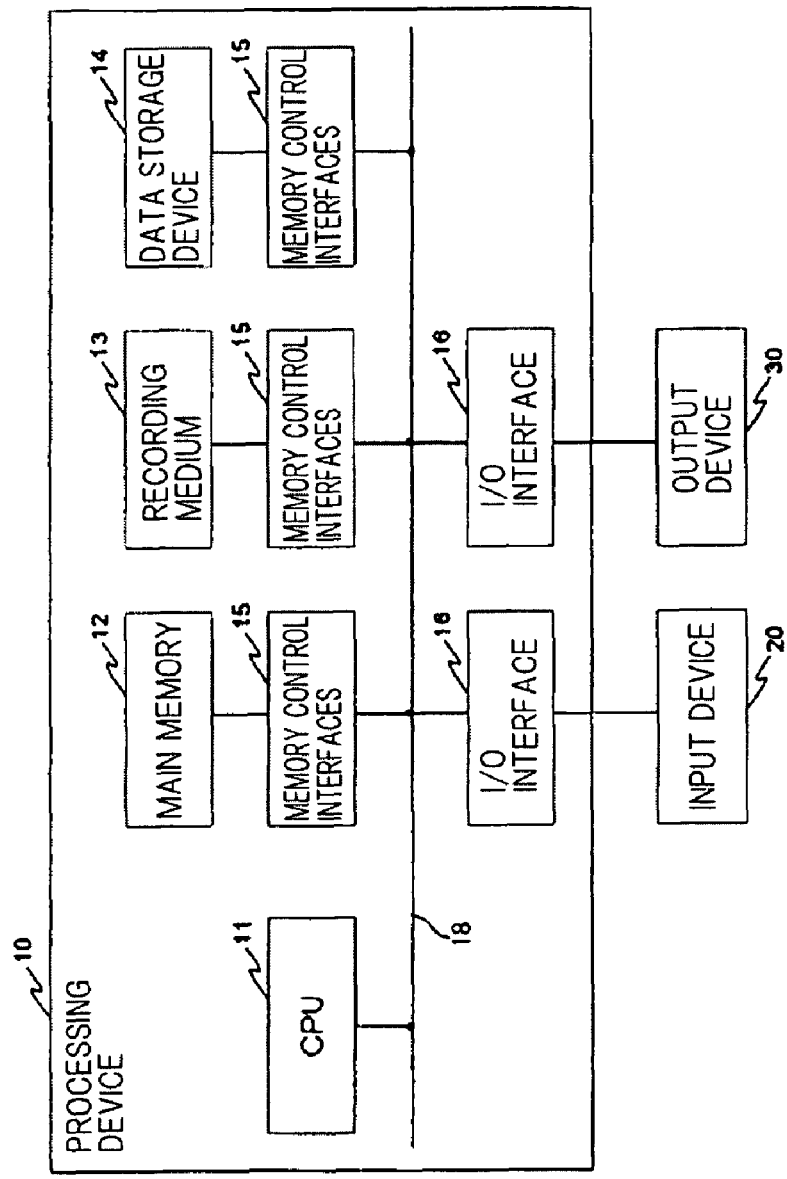
FIG. 4 is a block diagram of the configuration of a computer which implements shared information generating apparatus 100 or recovering apparatus 200.

FIG. 4 is a block diagram of the configuration of a computer which implements shared information generating apparatus 100 or recovering apparatus 200. As shown in FIG. 4, the computer comprises processing device 10, input device 20, and output device 30. Processing device 10 carries out prescribed processes according to programs. Input device 20 is an input device for inputting commands and information to processing device 10. Output device 30 is an output device for monitoring processed results from processing device 10.

Processing device 10 comprises CPU 11, main memory 12, recording medium 13, data storage device 14, memory control interfaces 15, and I/O interfaces 16 which are interconnected by bus 18.

CPU 11 is a processor for executing programs. Main memory 12 temporarily stores information required to be processed by CPU 11. Recording medium 13 stores programs to be executed by CPU 11. Data storage device 14 stores secret information and access structure data. Memory control interfaces 15 are interface devices for controlling the writing of data in and the reading of data from main memory 12, recording medium 13, or data storage device 14. I/O interfaces 16 are interface devices for controlling the inputting of data from input device 20 and the outputting of data to output device 30.

In the illustrated example, data storage device 14 is present in processing device 10. However, data storage device 14 may not be present in processing device 10. According to another example, data storage device 14 may be present separately from processing device 10, and may be connected to processing device 10. Data storage device 14 may be used as memory devices 300 having secret information share memories 301 and cheater identifying information memories 302.

Recording medium 13 comprises a magnetic disk, a semiconductor memory, or any of other recording mediums.

Figure 5:
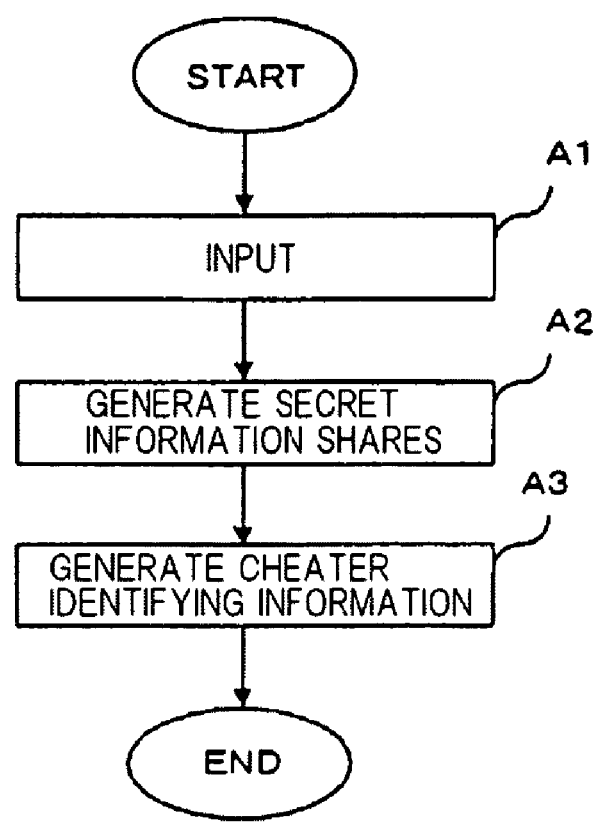
FIG. 5 is a flowchart of an operation sequence of shared information generating apparatus 100.

FIG. 5 is a flowchart of an operation sequence of shared information generating apparatus 100. As shown in FIG. 5, secret information s, threshold value k, total number n of information shares, and assumed number t of cheaters are input to shared information generating apparatus 100 (step A1). In shared information generating apparatus 100, secret information sharing device 101 performs an encoding process for generating n secret information shares v1 . . . vn using secret information s, threshold value k, and total number n of information shares, and stores generated n secret information shares v1 . . . vn in secret information share memories 301-1 . . . 301-$n$ of respective memory devices 300-1 . . . 300-$n$ (step A2).

Then, cheater identifying information generating device 102 generates cheater identifying information A1 . . . An corresponding respectively to secret information shares v1 . . . vn using assumed number t of cheaters and total number n of information shares which have been input, and secret information shares v1 . . . vn generated by secret information sharing device 101, and stores cheater identifying information A1 . . . An in cheater identifying information memories 302-1 . . . 302-$n$ of respective memory devices 300-1 . . . 300-$n$ (step A3).

Figure 6:
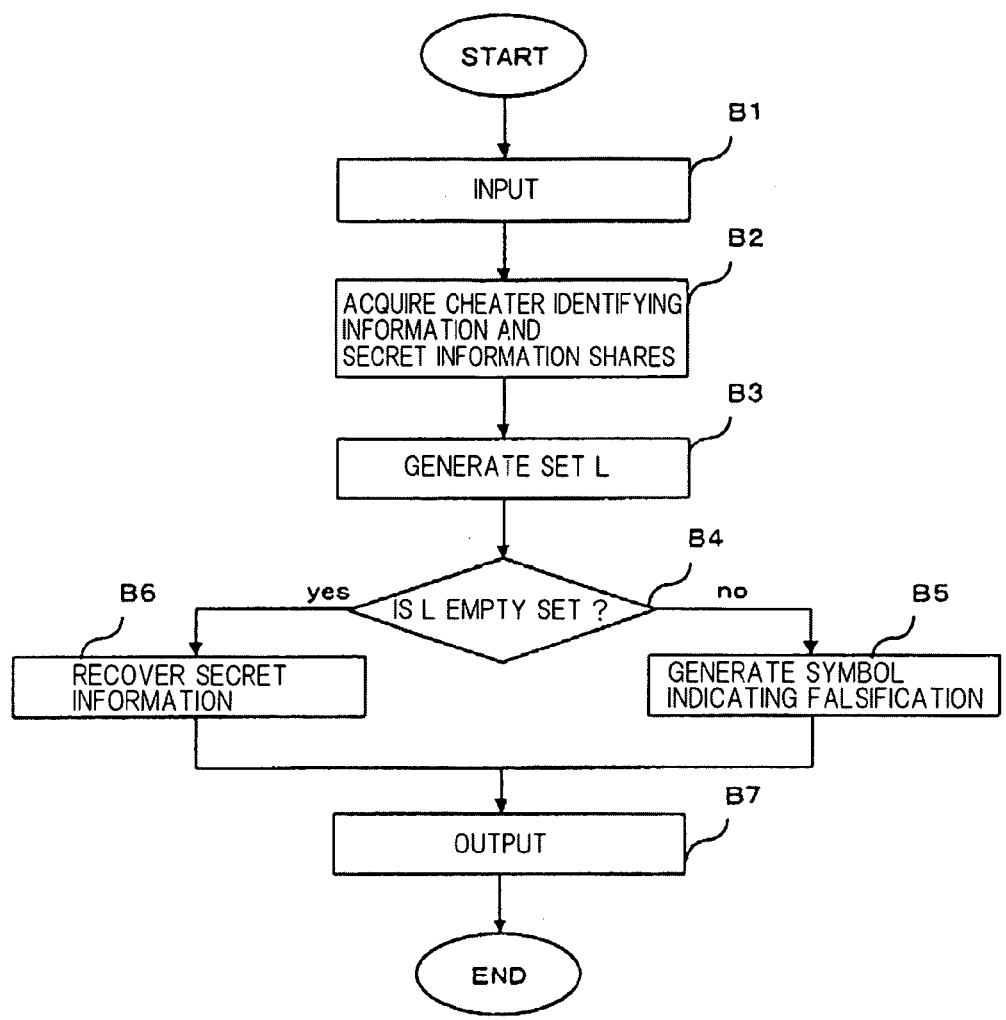
FIG. 6 is a flowchart of an operation sequence of recovering apparatus 200.

FIG. 6 is a flowchart of an operation sequence of recovering apparatus 200. As shown in FIG. 6, threshold value k and assumed number t of cheaters are input to recovering apparatus 200 (step B1). Then, recovering apparatus 200 reads the cheater identifying information and the secret information shares which are stored in k memory devices 300 (step B2).

Cheater identifying device 202 of recovering apparatus 200 generates set L of elements representing identifiers of cheaters, using each of the cheater identifying information, each of the secret information shares, threshold value k, and assumed number t of cheaters (step B3).

Then, secret information recovering device 201 determines whether set L is an empty set or not (step B4). If set L is not an empty set, then secret information recovering device 201 generates a symbol indicating that there is falsification (step B5). If set L is an empty set, then secret information recovering device 201 recovers the secret information using k secret information shares (step B6). Finally, recovering apparatus 200 outputs set L generated by cheater identifying device 201 and the symbol generated by or the secret information recovered by secret information recovering device 202 (step B7).

1st Embodiment

A secret information sharing system according to a first embodiment uses GF(p) as a data set of secret information where p indicates powers of prime numbers and may be prime numbers themselves. GF(p) is a finite field with respect to powers p of prime numbers. Addition on the finite field is represented by +, subtraction by −, multiplication by *, division by /, and exponentiation by ^.

Secret information sharing device 101 according to the first embodiment encodes secret information into secret information shares according to the existing (k,n)-threshold secret sharing scheme disclosed in Document 1. Secret information recovering device 201 recovers the secret information according to a recovering process which corresponds to the (k,n)-threshold secret sharing scheme.

Shared information generating apparatus 100 and recovering apparatus 200 according to the first embodiment will be described below.

Secret information s, threshold value k, total number n of information shares, and assumed number t of cheaters are input to shared information generating apparatus 100 according to the first embodiment. It is assumed in the first embodiment that $k \geq 3*t+1$ is satisfied.

In shared information generating apparatus 100, secret information sharing device 101 randomly generates (k−1)th polynomials where the constant term on GF(p) is represented by s. The (k−1)th polynomials are denoted by fs(x). Secret information sharing device 101 calculates fs(1), fs(2), . . . , fs(n), and stores pairs Vi=(i, vi) (i=1, 2, . . . , n, vi=fs(i)) of the calculated (k−1)th polynomials and inputs i as secret information shares in secret information share memories 301-$i$ of respective memory devices 300-$i$.

Figure 7:
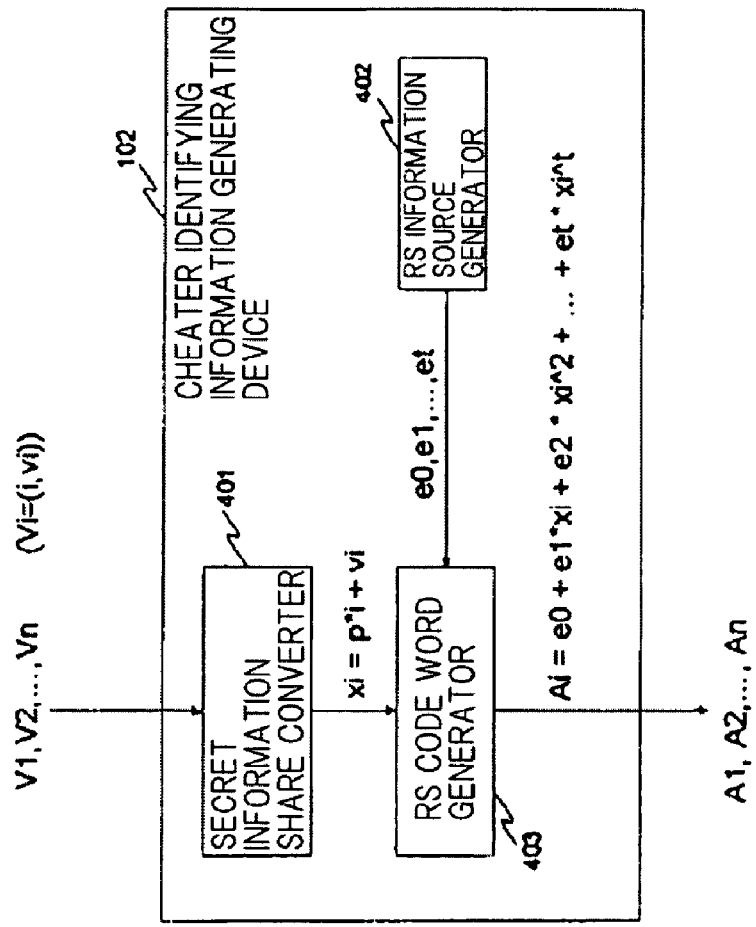
FIG. 7 is a block diagram of the configuration of cheater identifying information generating device 102 according to a first embodiment.

FIG. 7 is a block diagram of the configuration of cheater identifying information generating device 102 according to the first embodiment. As shown in FIG. 7, cheater identifying information generating device 102 comprises secret information share converter 401, RS information source generator 402, and RS code word generator 403.

Secret information share converter 401 acquires Vi=(i, vi) output from secret information sharing device 101, calculates $xi=p*(i-1)+vi (i=1, 2, \ldots, n)$ on finite field GF(q) with respect to q which satisfies $q \geq n*p$, and outputs calculated xi to RS code word generator 403.

RS information source generator 402 generates random data e0, e1, ..., et on finite field GF(q), and outputs the generated random data to RS code word generator 403.

RS code word generator 403 acquires $xi(i=1, 2, \ldots, n)$ output from secret information share converter 401 and e0, e1, ..., et output from RS information source generator 402, calculates $Ai=e0+e1*xi+e2*xi^2+ \ldots +et*xi^t (i=1, 2, \ldots, n)$ on finite field GF(q), and outputs calculated Ai respectively to memory devices 300-$i$ ($i=1, 2, \ldots, n$). A1, A2, ..., An represent the cheater identifying information in the first embodiment. Ai are stored respectively in cheater identifying information memories 302-$i$ of memory devices 300-$i$.

Threshold k and assumed number t of cheaters are input to recovering apparatus 200 according to the first embodiment.

Recovering apparatus 200 acquires data $V\{i\_j\}=(i\_j, v\{i\_j\})$ from respective secret information share memories 301 of k memory devices 300-$i\_1$, 300-$i\_2$, ..., 300-$i\_k$. Recovering apparatus 200 also acquires data $A\{i\_j\}$ ($j=1, 2, \ldots, k$) from respective cheater identifying information memories 302 of same k memory devices 300-$i\_1$, 300-$i\_2$, ..., 300-$i\_k$. Acquired data ($A\{i\_1\}, A\{i\_2\}, \ldots, A\{i\_k\}$) represent code words of a Reed-Solomon error-correcting code using random data e0, e1, ..., et output from RS information source generator 402 as information sources. If $k \geq 3t+1$, then it is possible correct t errors included in data $A\{i\_j\}$ and recover original information sources e0, e1, ..., et.

In recovering apparatus 200, data $V\{i\_j\}=(i\_j, v\{i\_j\})$ and data $A\{i\_j\}$ acquired from memory devices 300-$i\_1$, ..., 300-$i\_k$ are input to cheater identifying device 202.

Figure 8:
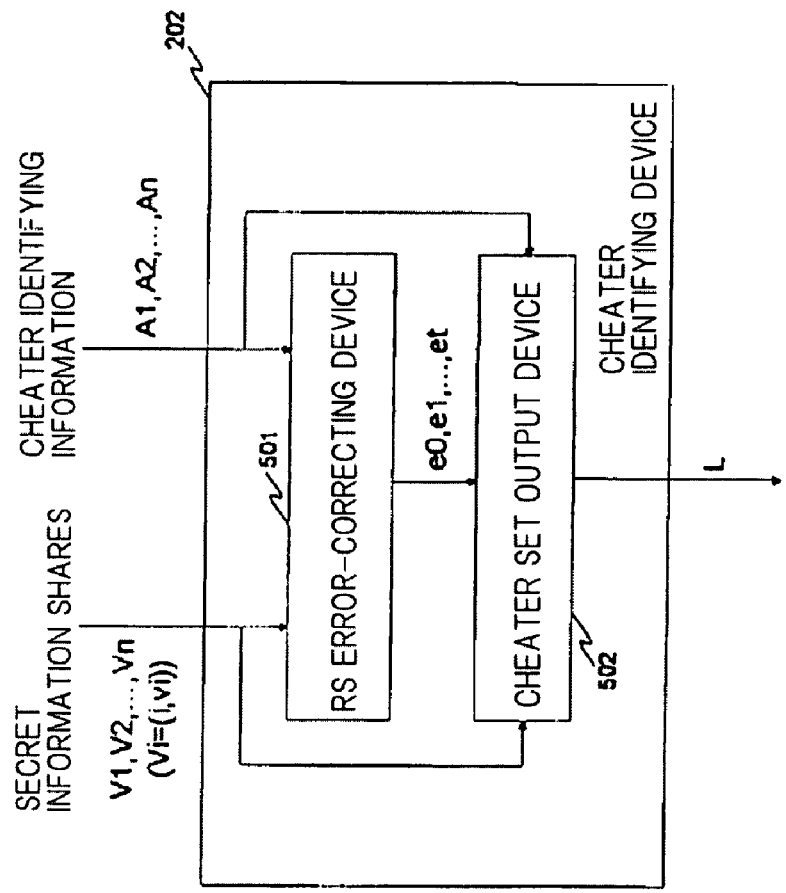
FIG. 8 is a block diagram of the configuration of cheater identifying device 202 according to the first embodiment.

FIG. 8 is a block diagram of the configuration of cheater identifying device 202 according to the first embodiment. As shown in FIG. 8, cheater identifying device 202 comprises RS error-correcting device 501 and cheater set output device 502.

RS error-correcting device 501 performs a Reed-Solomon error-correcting process using data $V\{i\_j\}=(i\_j, v\{i\_j\})$ and data $A\{i\_j\}$, recovers same random data e0, e1, ..., et as those generated by RS information source generator 402, and outputs the recovered random data to cheater set output device 502. The Reed-Solomon error-correcting process may be an existing process. There is an example of the exiting Reed-Solomon error-correcting process is the Berlekamp algorithm.

Cheater set output device 502 acquires data $V\{i\_j\}=(i\_j, v\{i\_j\})$ from respective secret information share memories 301 of k memory devices 300-$i\_1$, 300-$i\_2$, ..., 300-$i\_k$. Cheater set output device 502 also acquires data $A\{i\_j\}$ ($j=1, 2, \ldots, k$) from respective cheater identifying information memories 302 of same k memory devices 300-$i\_1$, 300-$i\_2$, ..., 300-$i\_k$. Using the acquired data, cheater set output device 502 calculates $x\{i\_j\}=p*(i\_j-1)+v\{i\_j\}$ ($j=1, 2, \ldots, k$), outputs set L of i_j where $A\{i\_j\}=e0+e1*x\{i\_j\}+e2*x\{i\_j\}^2+ \ldots +et*x\{i\_j\}^t$ is not satisfied.

Secret information recovering device 201 acquires set (cheater list) L from cheater identifying device 202 and determines whether set L is an empty set or not. If set L is not an empty set, then secret information recovering device 201 outputs a symbol indicating that cheating is detected. If set L is an empty set, then since it means that no cheating is detected, secret information recovering device 201 performs a process of recovering the secret information. In the process of recovering the secret information, secret information recovering device 201 acquires data $V\{i\_j\}=(i\_j, v\{i\_j\})$ from respective secret information share memories 301 of memory devices 300-$i\_1$, 300-$i\_2$, ..., 300-$i\_k$, and recovers the secret information using the acquired data. The recovered secret information represents value fs(0) at the time x=1 with respect to the (k-1)th polynomials fs(x) that are used when secret information sharing device 101 has generated secret information shares. fs(0) may be determined by an existing process. There is an example of existing process a process for solving k-element, linear simultaneous equations or a method using Lagrange interpolation.

Set L which is output from cheater identifying device 202 and the secret information which is output from secret information recovering device 201 are output from recovering apparatus 200.

According to the first embodiment, as described above, in shared information generating apparatus 100, secret information sharing device 101 generates n secret information shares $Vi (i=1, 2, \ldots, n)$ according to the (k,n)-threshold secret sharing scheme. Cheater identifying information generating device 102 generates cheater identifying information $Ai (i=1, 2, \ldots, n)$ with respect to respective secret information shares Vi, using random t-th polynomials where t represents a value satisfying prescribed condition associated with threshold value k. At this time, if t or less secret information shares of arbitrary k secret information shares $V\{i\_j\}$ ($j=1, 2, \ldots, k$) have errors, then cheater identifying information generating device 102 generates cheater identifying information which makes it possible to detect and correct the errors according to the Reed-Solomon error-correcting process. In recovering apparatus 200, cheater identifying device 202 performs the Reed-Solomon error-correcting process using arbitrary k secret information shares $V\{i\_j\}$ ($j=1, 2, \ldots, k$) and the cheater identifying information corresponding thereto, and outputs set L of symbols representative of the erroneous secret information shares. If no errors are detected according to the Reed-Solomon error-correcting process performed by cheater identifying device 202, then secret information recovering device 201 recovers the secret information from k secret information shares $V\{i\_j\}$. Since the cheater identifying information which makes it possible to detect and correct the errors according to the Reed-Solomon error-correcting process is generated using secret information shares Vi and the random t-th polynomials, the size of secret information shares in the secret information sharing system which can identify falsified secret information shares is made smaller than heretofore.

According to the first embodiment, values $xi (i=1, 2, \ldots, n)$ uniquely derived from respective secret information shares $Vi (i=1, 2, \ldots, n)$ are assigned to the random t-th polynomials where t represents a value satisfying prescribed condition associated with threshold value k, and the calculated values are used as cheater identifying information Ai with respect to respective secret information shares Vi. When values xi are generated from secret information shares Vi and i such that $xi \neq xj$ is satisfied if $vi \neq vj$ where vi, vj represent arbitrary values, $xi=p*(i-1)+vi (i=1, 2, \ldots, n)$ is calculated on finite field GF(q) with respect to q which satisfies $q \leq n*p$. In the present embodiment wherein the secret information has a size p, the secret information shares have a size $p*q$. The probability that falsified secret information shares will be output as the elements of set L, i.e., the probability that falsification will be detected, is $1-1/q$. If the same parameters are used in the process disclosed in Document 5, then the secret information shares have a size $p*q^{\{t+2\}}$. According to the present embodiment, therefore, the size of the secret information shares is greatly reduced from $p*q^{\{t+2\}}$ to $p*q$.

2nd Embodiment

A secret information sharing system according to a second embodiment uses GF(P^N) as a data set of secret information where p indicates powers of prime numbers which are the same as used in the first embodiment. As with the first embodiment, addition on the finite field is represented by +, subtraction by −, multiplication by *, division by /, and exponentiation by ^.

As with the first embodiment, secret information sharing device 101 according to the second embodiment encodes secret information into secret information shares according to the (k,n)-threshold secret sharing scheme disclosed in Document 1. Secret information recovering device 201 recovers the secret information according to a recovering process which corresponds to the (k,n)-threshold secret sharing scheme.

Shared information generating apparatus 100 and recovering apparatus 200 according to the second embodiment will be described below.

Secret information s, threshold value k, total number n of information shares, and assumed number t of cheaters are input to shared information generating apparatus 100 according to the second embodiment. It is also assumed in the second embodiment that $k \geq -3*t+1$ is satisfied.

When s, k, n, t are input to shared information generating apparatus 100, secret information sharing device 101 randomly generates (k−1)th polynomials where the constant term on GF(p^N) is represented by s. The (k−1)th polynomials are denoted by fs(x).

In shared information generating apparatus 100, secret information sharing device 100 calculates fs(1), fs(2), ..., fs(n), and stores pairs Vi=(i, v{i,0}, v{i,1}, ..., v{i,N−1}) (i=1, 2, ..., n) of the calculated (k−1)th polynomials and inputs i in secret information share memories 301-i of respective memory devices 300-i, where (i, v{i,0}, v{i,1}, ..., v{i,N−1}) indicates a vector representation of fs(i) with v{i,j} representing the elements of GF(p).

Figure 9:
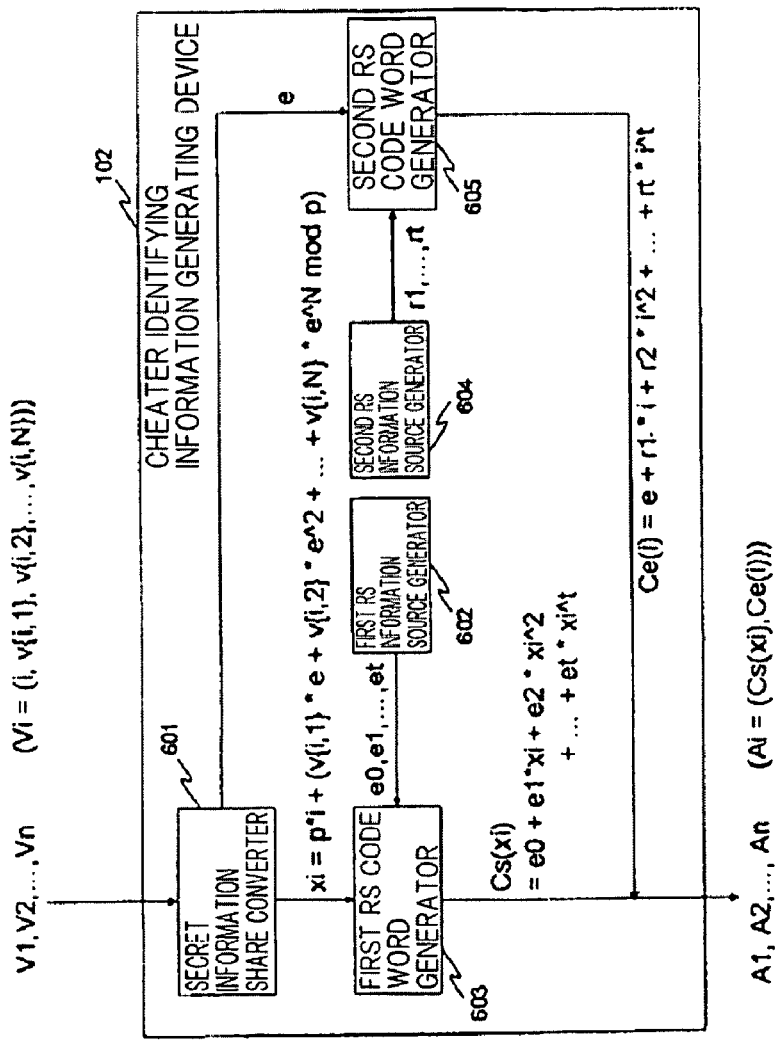
FIG. 9 is a block diagram of the configuration of cheater identifying information generating device 102 according to a second embodiment.

FIG. 9 is a block diagram of the configuration of cheater identifying information generating device 102 according to the second embodiment. As shown in FIG. 9, cheater identifying information generating device 102 comprises secret information share converter 601, first RS information source generator 602, first RS code word generator 603, second RS information source generator 604, and second RS code word generator 605.

When total number n of information shares and assumed number t of cheaters are input to cheater identifying information generating device 102, secret information share converter 601 acquires Vi=(i, v{i,0}, ..., v{i,N−1}) output from secret information sharing device 101, randomly selects e on GF(p), and outputs selected e to second RS code word generator 605.

Secret information share converter 601 calculates yi=v{i,0}+v{i,1}*e+v{i,2}*e^2+ ... +v{i,N−1}e^{N−1} (i=1, 2, ..., n). Then, secret information share converter 601 calculates xi=p*(i−1)+yi(i=1, 2, ..., n) on GF(q) with respect to q which satisfies $q \geq n*p$, and outputs calculated xi to first RS code word generator 603.

First RS information source generator 602 outputs random data e0, e1, ..., et on GF(q) to first RS code word generator 603.

First RS code word generator 603 acquires xi(i=1, 2, ..., n) output from secret information share converter 601 and e0, e1, ..., et output from first RS information source generator 602, calculates Cs(xi)=e0+e1*xi+e2*xi^2+ ... +et*xi^t(i=1, 2, ..., n) on GF(q), and outputs calculated Cs(xi).

Second information source generator 604 selects random data r1, ..., rt on GF(p), and outputs the selected random data to second RS code word generator 605.

Second RS code word generator 605 acquires e output from secret information share converter 601 and r1, ..., r5 output from second information source generator 604, calculates Ce(xi)=e+r1*i+r2*i^2+ ... +rt*i^t(i=1, 2, ..., n) on GF(q), and outputs calculated Ce(xi).

Ai=(Cs(xi), Ce(i)) (i=1, 2, ..., n) which comprise Cs(xi) (i=1, 2, ..., n) output from first RS code word generator 603 and Ce(i) output from second RS code word generator 605 serve as cheater identifying information corresponding to secret information shares vi. Cheater identifying information A1, A2, ..., An is output respectively to memory devices 300-i (i=1, 2, ..., n). Ai are stored respectively in cheater identifying information memories 302-i of memory devices 300-i.

Threshold k and assumed number t of cheaters are input to recovering apparatus 200 according to the second embodiment.

Recovering apparatus 200 acquires data V{i_j}=(i_j, v{i_j,1}, v{i_j,2}, ..., v{i_j,N−1} from respective secret information share memories 301 of k memory devices 300-i_1, 300-i_2, ..., 300-i_k. Recovering apparatus 200 also acquires data A{i_j} (j=1, 2, ..., k) from respective cheater identifying information memories 302 of same k memory devices 300-i_1, 300-i_2, ..., 300-i_k.

In A{i_j}=(Cs(x{i_j}), Ce(i_j)), (Cs(x{i_1}), Cs(x{i_2}), ..., Cs(x{i_k})) represent code words of a Reed-Solomon error-correcting code using random data e0, e1, ..., et output from first RS information source generator 602 as information sources. If $k \geq 3t+1$, then it is possible correct t errors included in data Cs(x{i_j}) and recover original information sources e0, e1, ..., et.

Similarly, (Ce(i_1), Ce(i_2), ..., Ce(i_k)) represent code words of a Reed-Solomon error-correcting code using random data r1, r2 ..., rt as information sources where e represents the data output from secret information share converter 601 and r1, ..., rt the random data output from second RS code word generator 605. If $k \geq 3t+1$, then it is possible correct t errors included in data Ce(i_j) and recover original information sources r1, ..., rt.

The data of the secret information shares and the data of the cheater identifying information from k memory devices 300-i_1 ... 300-i_k are input to cheater identifying device 202.

Figure 10:
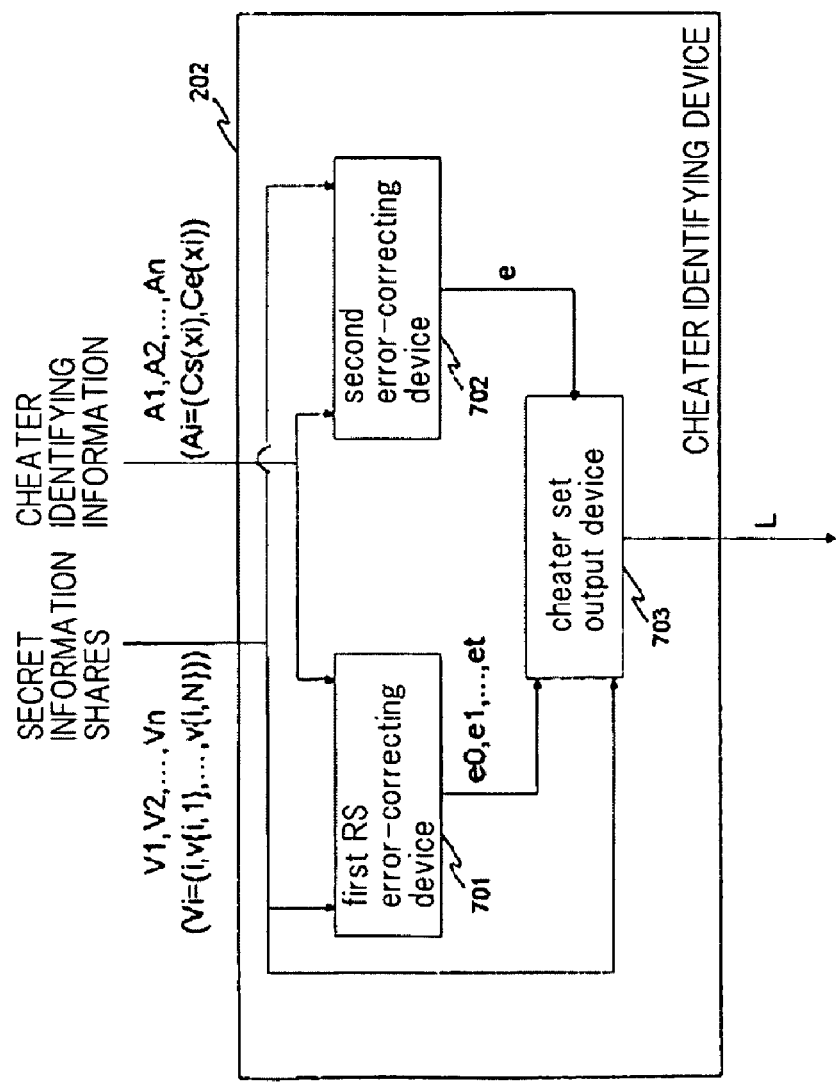
FIG. 10 is a block diagram of the configuration of cheater identifying device 202 according to the second embodiment.

FIG. 10 is a block diagram of the configuration of cheater identifying device 202 according to the second embodiment. As shown in FIG. 10, cheater identifying device 202 comprises first RS error-correcting device 701, second error-correcting device 702, and cheater set output device 703.

First RS error-correcting device 701 performs a Reed-Solomon error-correcting process on code words (Cs(x{i_1}), ..., (Cs(x{i_k}), recovers same e0, e1, ..., et as those output from first RS information source generator 602 of cheater identifying information generating device 102, and outputs recovered e0, e1, ..., et to cheater set output device 703.

Second RS error-correcting device 702 performs a Reed-Solomon error-correcting process on code words (Ce(i_1), ..., Ce(i_k)), recovers same e0, e1, ..., et as those output from first RS information source generator 602 of cheater identifying information generating device 102, and outputs recovered e0, e1, ..., et to cheater set output device 703.

Cheater set output device 502 acquires data V{i_j}=(i_j, v{i_j,0}, ..., v{i_j,N−1}) from respective secret information share memories 301 of k memory devices 300-i_1, 300-i_2, ..., 300-i_k, and also acquires data A{i_j}=(Cs(x{i_j}), Ce(i_j)) (j=1, 2, ..., k) from respective cheater identifying information memories 302. Cheater set output device 502 calculates $yi=v\{i,0\}+v\{i,1\}*e+v\{i,2\}*e^2+\ldots+v\{i,N-1\}e^{\{N-1\}}$ ($i=1, 2, \ldots, n$) on $GF(p)$, and also calculates $x\{i\_j\}=p*(i\_j-1)+yi$ ($i=1, 2, \ldots, n$) on $GF(q)$. Then, cheater set output device 502 outputs set L of i_j where $Ce(i\_j)=e0+e1*x\{i\_j\}+e2*x\{i\_j\}^2+\ldots+et*x\{i\_j\}^t$ is not satisfied, as a cheater list. Set (cheater list) L is output from cheater identifying device 202.

Secret information recovering device 201 acquires set L from cheater identifying device 202 and determines whether set L is an empty set or not. If set L is not an empty set, then secret information recovering device 201 outputs a symbol indicating that cheating is detected. If set L is an empty set, then since it means that no cheating is detected, secret information recovering device 201 acquires secret information shares $V\{i\_j\}=(i\_j, v\{i\_j,0\}, \ldots, v\{i\_j,N-1\}$ from respective secret information share memories 301 of k memory devices 300-$i\_1$, 300-$i\_2$, . . . , 300-$i\_k$, and recovers the secret information using the acquired data. The recovered secret information represents value fs(0) at the time x=1 with respect to the (k−1)th polynomials fs(x) that are used when secret information sharing device 101 has generated secret information shares. fs(0) may be determined by an existing process. There is an example of existing process a process for solving k-element, linear simultaneous equations or a method using Lagrange interpolation.

Set L which is output from cheater identifying device 202 and the secret information which is output from secret information recovering device 201 are output from recovering apparatus 200.

According to the second embodiment, as described above, values xi(i=1, 2, . . . , n) uniquely derived from respective secret information shares Vi(i=1, 2, . . . , n) and randomly selected e are determined and assigned to the random t-th polynomials Cs(xi) where t represents a value satisfying prescribed condition associated with threshold value k, to determine Cs(xi), and values comprising Cs(xi) and Ce(i) are used as cheater identifying information Ai with respect to respective secret information shares Vi. At this time, random values e are used to calculate $yi=v\{i,0\}+v\{i,1\}*e+v\{i,2\}*e^2+\ldots+v\{i,N-1\}e^{\{N-1\}}$ (i=1, 2, . . . , n) such that xi≠xj is satisfied with high probability if vi≠vj where vi, vj represent arbitrary values, and xi=p*(i−1)+yi(i=1, 2, . . . , n) is calculated using calculated yi. In the present embodiment wherein the secret information has a size $p^N$, the secret information shares have a size $p^{\{N+1\}}*q$. The probability that falsification will be detected is 1−N/p−1/q. According to the first embodiment, there is limitation q≧n*p between size p of the secret information shares and cheating detecting probability 1-1/q. According to the second embodiment, however, the limitation between the size of the secret information shares and the cheating detecting probability is eliminated by selecting suitable p.

3rd Embodiment

A secret information sharing system according to a third embodiment uses GF(p) as a data set of secret information where GF(p) represents a finite field with respect to powers p of prime numbers. As with the first embodiment, addition on the finite field is represented by +, subtraction by −, multiplication by *, division by /, and exponentiation by ^.

As with the first embodiment, secret information sharing device 101 according to the third embodiment encodes secret information into secret information shares according to the (k,n)-threshold secret sharing scheme disclosed in Document 1. Secret information recovering device 201 recovers the secret information according to a recovering process which corresponds to the (k,n)-threshold secret sharing scheme.

Shared information generating apparatus 100 and recovering apparatus 200 according to the third embodiment will be described below.

Secret information s, threshold value k, total number n of information shares, and assumed number t of cheaters are input to shared information generating apparatus 100 according to the third embodiment. It is assumed in the third embodiment that k≧2*t+1 is satisfied.

In shared information generating apparatus 100, secret information sharing device 101 randomly generates (k−1)th polynomials where the constant term on GF(p) is represented by s. The (k−1)th polynomials are denoted by fs(x).

Secret information sharing device 101 calculates fs(1), fs(2), . . . , fs(n), and stores pairs Vi=(i, vi) (i=1, 2, . . . , n, vi=fs(i)) of the calculated (k−1)th polynomials and inputs i in secret information share memories 301-$i$ of respective memory devices 300-$i$.

Figure 11:
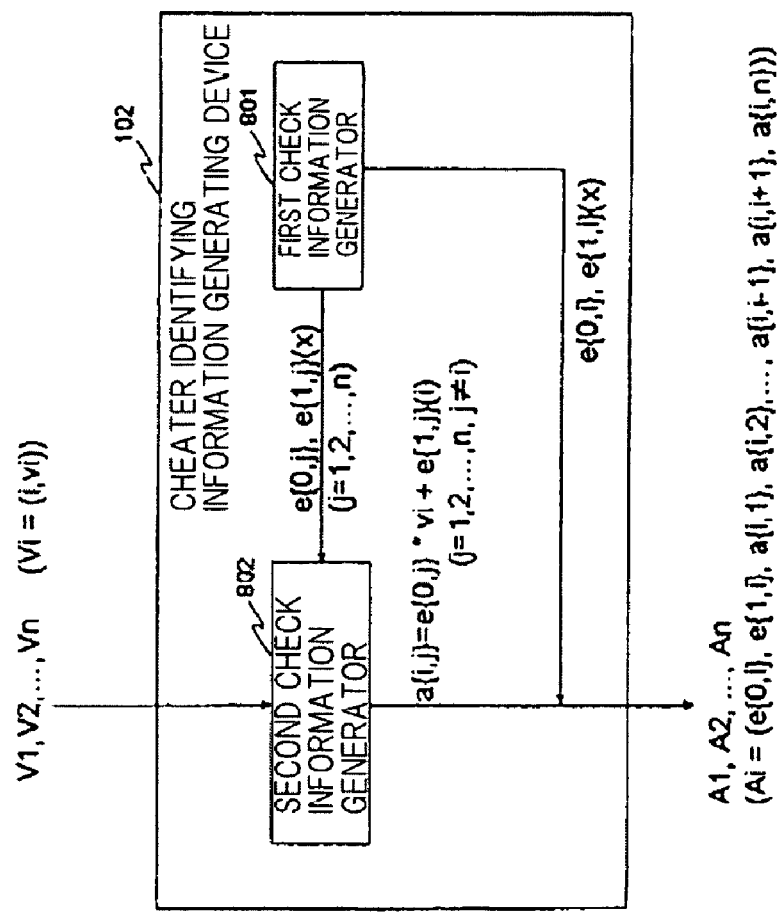
FIG. 11 is a block diagram of the configuration of cheater identifying information generating device 102 according to a third embodiment.

FIG. 11 is a block diagram of the configuration of cheater identifying information generating device 102 according to the third embodiment. As shown in FIG. 11, cheater identifying information generating device 102 comprises first check information generator 801 and second check information generator 802.

First check information generator 801 generates and outputs random data e{0,i} (i=1, 2, . . . , n) on GF(p) and random (t−1)th polynomials e{1,i}(x) (i=1, 2, . . . , n) on GF(p), based on total number n of information shares and assumed number t of cheaters, and sends random data e{0,i} and random (t−1)th polynomials e{1,i}(x) to second check information generator 802.

Second check information generator 802 calculates a{i, j}=e{0,j}*vi+e{1,j}(i) where i=1, 2, . . . , n, j=1, 2, . . . , i−1, i+1, . . . , n from (i,vi) (i=1, 2, . . . , n) generated by secret information sharing device 101 and e{0,i}, e{1,i}(x) generated by first check information generator 801, and outputs calculated a{i,j}.

Ai=(e{0,i}, e{1,i}(x), a{i,1}, a{i,2}, . . . , a{i,i−1}, a{i,i+1}, . . . , a{i,n}) which comprise e{0,i}, e{1,i}(x) generated by first check information generator 801 and a{i,j} generated by second check information generator 802 are output from cheater identifying information generating device 102. Ai are stored respectively in cheater identifying information memories 302-$i$ of memory devices 300-$i$.

Threshold k and assumed number t of cheaters are input to recovering apparatus 200 according to the third embodiment.

Recovering apparatus 200 acquires data $V\{i\_j\}=(i\_j, v\{i\_j\})$ from respective secret information share memories 301 of k memory devices 300-$i\_1$, 300-$i\_2$, . . . , 300-$i\_k$. Recovering apparatus 200 also acquires data A{i_j} (j=1, 2, . . . , k) from respective cheater identifying information memories 302 of same k memory devices 300-$i\_1$, 300-$i\_2$, . . . , 300-$i\_k$.

In recovering apparatus 200, cheater identifying device 202 checks if the relationship a{1,m}=e{0,m}*vl+e{1,m}(l) where l=$i\_1$, $i\_2$, . . . , $i\_k$, m=$i\_1$, $i\_2$, $i\_k$ (m≠l), using data $V\{i\_j\}=(i\_j, v\{i\_j\})$ from respective secret information share memories 301 of k memory devices 300-$i\_1$, 300-$i\_2$, . . . , 300-$i\_k$ and data A{i_j}=(e{0,i_j}, e{1,i_j}(x), a{i_j,1}, a{i_j,2}, . . . , a{i_j,i_j−1}, a{i_j,i_j+1}, . . . , a{i_j,n}) (j=1, 2, . . . , k) from respective cheater identifying information memories 302. Then, cheater identifying device 202 outputs a set of ls where the above relationship is not satisfied with respect to k/2 ms or more based on the results of the check, as cheater list L.

Secret information recovering device 201 acquires cheater list L from cheater identifying device 202, and determines whether set L is an empty set or not. If set L is not an empty set, then secret information recovering device 201 outputs a symbol indicating that cheating is detected. If set L is an empty set, then since it means that no cheating is detected, secret information recovering device 201 acquires data $V\{i\_j\}=(i\_j, v\{i\_j\})$ from respective secret information share memories 301 of memory devices 300-$i\_1$, 300-$i\_2$, 300-$i\_k$, determines fs(0) with respect to the (k−1)th polynomials fs(x) that are used when secret information sharing device 101 has generated secret information shares, and outputs fs(0) as secret information. fs(0) may be determined by an existing process. There is an example of existing process a process for solving k-element, linear simultaneous equations or a method using Lagrange interpolation.

Set L which is output from cheater identifying device 202 and the secret information which is output from secret information recovering device 201 are output from recovering apparatus 200.

According to the third embodiment, as described above, in shared information generating apparatus 100, secret information sharing device 101 generates n secret information shares Vi(i=1, 2, . . . , n) according to the (k,n)-threshold secret sharing scheme. Cheater identifying information generating device 102 uses values obtained by check condition equations as cheater identifying information Ai(i=1, 2, . . . , n) corresponding to respective secret information shares Vi(i=1, 2, . . . , n), using n secret information shares Vi generated by secret information sharing device 101, the random data generated by cheater identifying information generating device 102, and the random (t−1)th polynomials where t represents a value satisfying prescribed condition associated with threshold value k. Cheater identifying information Ai generated at this time, the combination of arbitrary values i, j(i=1, 2, . . . , n, j=1, 2, . . . , n, i≠j), and secret information shares Vi satisfy the check condition equations. In recovering apparatus 200, cheater identifying device 202 determines whether the above check condition equations are satisfied or not using arbitrary k secret information shares Vi$\{i\_j\}$ (j=1, 2, . . . , k) and cheater identifying information A$\{i\_j\}$ (j=1, 2, . . . , k) corresponding thereto, and determines whether the k secret information shares have been falsified or not based on the determined result about whether the above check condition equations are satisfied or not. If the secret information shares have not been falsified, then recovering apparatus 200 recovers the secret information from k secret information shares Vi$\{i\_j\}$. Since the cheater identifying information is generated from secret information shares Vi, the random data, and the random (t−1)th polynomials, the size of secret information shares in the secret information sharing system which can identify falsified secret information shares is made smaller than heretofore.

In the third embodiment wherein the secret information has a size p, the secret information shares have a size p^{n+t+1}. The probability that falsified secret information shares will be output as the elements of set L, i.e., the probability that falsification will be detected, is 1−k/(2*p). If the same parameters are used in the process disclosed in Document 4, then the secret information shares have a size p^{3n−2}. According to the present embodiment, therefore, the size of the secret information shares is greatly reduced from p^{3n−2} to p^{n+t+1}.

4th Embodiment

A secret information sharing system according to a fourth embodiment uses GF(PAN) as a data set of secret information where GF(p^N) represents a finite field with respect to p^N where p represents powers of prime numbers. Addition on the finite field is represented by +, subtraction by −, multiplication by *, division by /, and exponentiation by ^.

As with the first embodiment, secret information sharing device 101 according to the fourth embodiment encodes secret information into secret information shares according to the (k,n)-threshold secret sharing scheme disclosed in Document 1. Secret information recovering device 201 recovers the secret information according to a recovering process which corresponds to the (k,n)-threshold secret sharing scheme.

Shared information generating apparatus 100 and recovering apparatus 200 according to the fourth embodiment will be described below.

Secret information s, threshold value k, total number n of information shares, and assumed number t of cheaters are input to shared information generating apparatus 100 according to the fourth embodiment. It is assumed in the fourth embodiment that k≧2*t+1 is satisfied as with the third embodiment.

In shared information generating apparatus 100, secret information sharing device 101 randomly generates (k−1)th polynomials where the constant term on GF(PAN) is represented by s. The (k−1)th polynomials are denoted by fs(x). Secret information sharing device 101 calculates fs(1), fs(2), . . . , fs(n), and stores pairs Vi=(i, v$\{i,1\}$, v$\{i,2\}$, . . . , v$\{i,N\}$,) (i=1, 2, . . . , n, vi=fs(i)) of the calculated (k−1)th polynomials and inputs i in secret information share memories 301-$i$ of respective memory devices 300-$i$.

Figure 12:
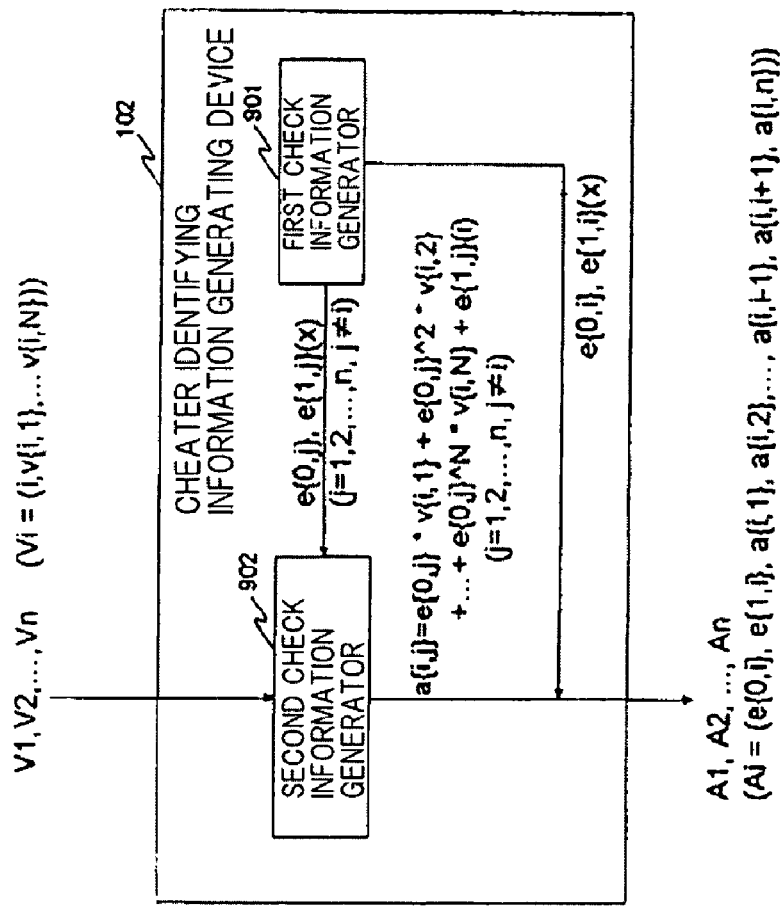
FIG. 12 is a block diagram of the configuration of cheater identifying information generating device 102 according to a fourth embodiment.

FIG. 12 is a block diagram of the configuration of cheater identifying information generating device 102 according to the fourth embodiment. As shown in FIG. 12, cheater identifying information generating device 102 comprises first check information generator 901 and second check information generator 902.

First check information generator 901 generates and outputs random data e$\{0,i\}$ (i=1, 2, . . . , n) on GF(p) and random (t−1)th polynomials e$\{1,i\}$(x) (i=1, 2, . . . , n) on GF(p), based on total number n of information shares and assumed number t of cheaters, and sends random data e$\{0,i\}$ and random (t−1)th polynomials e$\{1,i\}$(x) to second check information generator 902.

Second check information generator 902 calculates a$\{i,j\}$=e$\{0,j\}$*v$\{i,1\}$+e$\{0,j\}$^2*v$\{i,2\}$+ . . . +e$\{0,j\}$^N*v$\{i,N\}$+e$\{i,j\}$(i) where i=1, 2, . . . , n, j=1, 2, . . . , i−1, i+1, . . . , n from (i,vi) (i=1, 2, . . . , n) generated by secret information sharing device 101 and e$\{0,i\}$, e$\{1,i\}$(x) acquired from first check information generator 801, and outputs calculated a$\{i,j\}$.

Ai=(e$\{0,i\}$, e$\{1,i\}$(x), e$\{i,1\}$, e$\{i,2\}$, . . . , a$\{i,i−1\}$, a$\{i,i+1\}$, . . . , a$\{i,n\}$) which comprise e$\{0,i\}$, e$\{1,i\}$(x) generated by first check information generator 901 and a$\{i,j\}$ generated by second check information generator 902 are output from cheater identifying information generating device 102. Ai are stored respectively in cheater identifying information memories 302-$i$ of memory devices 300-$i$.

Threshold k and assumed number t of cheaters are input to recovering apparatus 200 according to the fourth embodiment.

Recovering apparatus 200 acquires data V$\{i\_j\}$=(i\_j, v$\{i\_j,1\}$, v$\{i\_j,2\}$, . . . , v$\{i\_j,N\}$) from respective secret information share memories 301 of k memory devices 300-$i\_1$, 300-$i\_2$, . . . , 300-$i\_k$. Recovering apparatus 200 also acquires data A$\{i\_j\}$ (j=1, 2, . . . , k) from respective cheater identifying information memories 302 of same k memory devices 300-$i\_1$, 300-$i\_2$, . . . , 300-$i\_k$.

In recovering apparatus 200, cheater identifying device 202 checks if the relationship a{l,m}=e{0,m}*v{l,1}+e{0,m}^2*v{l,2}+ . . . +e{0,m}^N*v{l,N}+e{1,m}(l) where l=i_1, i_2, . . . , i_k, m=i_1, i_2, i_k (m≠l), using data V{i_j}=(i_j, v{i_j,1}, v{i_j,2}, . . . , v{i_j,N}) from respective secret information share memories 301 of k memory devices 300-i_1, 300-i_2, . . . , 300-i_k and data A{i_j}=(e{0,i_j}, e{1, i_j}(x), a{i_j,1}, a{i_j,2}, . . . , a{i_j, i_j−1}, a{i_j, i_j+1}, . . . , a{i_j,n}) (j=1, 2, . . . , k) from respective cheater identifying information memories 302. Then, cheater identifying device 202 outputs a set of ls where the above relationship is not satisfied with respect to k/2 ms or more based on the results of the check, as cheater list L.

Secret information recovering device 201 acquires cheater list L from cheater identifying device 202, and determines whether set L is an empty set or not. If set L is not an empty set, then secret information recovering device 201 outputs a symbol indicating that cheating is detected. If set L is an empty set, then since it means that no cheating is detected, secret information recovering device 201 acquires data V{i_j}=(i_j, v{i_j}) from respective secret information share memories 301 of memory devices 300-i_1, 300-i_2, . . . , 300-i_k, determines fs(0) with respect to the (k−1)th polynomials fs(x) that are used when secret information sharing device 101 has generated secret information shares, and fs(0) as secret information. fs(0) may be determined by an existing process. There is an example of existing process a process for solving k-element, linear simultaneous equations or a method using Lagrange interpolation.

Set L which is output from cheater identifying device 202 and the secret information which is output from secret information recovering device 201 are output from recovering apparatus 200.

In the fourth embodiment wherein the secret information has a size p^N, the secret information shares have a size p^{N+n+t}. The probability that falsified secret information shares will be output as the elements of set L, i.e., the probability that falsification will be detected, is 1−k*N/(2*p). According to the third embodiment, the cheating detecting probability 1−k/(2*p) is uniquely determined from size p of the secret information. According to the fourth embodiment, the secret size and the cheater identifying probability can independently be established by selecting appropriate N.

The present invention has been described above with reference to the exemplary embodiment (and the embodiments), the present invention is not limited to the exemplary embodiment (and the embodiments). Various changes that are readily comprehensible to those skilled in the art may be made to the configuration and details of the present invention as defined in the claims within the scope of the invention.

The present application is the National Phase of PCT/JP2007/067278, filed Sep. 5, 2007, which claims the benefits of priority based on Japanese patent application No. 2006-288911 filed on Oct. 24, 2006, and the disclosure thereof is incorporated by reference in its entirety herein.

The invention claimed is:

1. A secret information sharing system for splitting secret information into a plurality of secret information shares according to a (k,n)-threshold secret sharing scheme and managing the secret information shares, comprising:
  a shared information generating apparatus including a processor and a non-transitory computer-readable medium storing a program executable by the processor and that generates n secret information shares Vi(i=1, 2, . . . , n) from said secret information according to the (k,n)-threshold secret sharing scheme, and generates cheater identifying information Ai(i=1, 2, . . . , n), which makes it possible to detect and correct the errors according to a Reed-Solomon error-correcting process if t or less secret information shares of arbitrary k secret information shares V{i_j} (j=1, 2, . . . , k) have errors, in association with said n secret information shares Vi, using the generated n secret information shares Vi and random t-th polynomials where t represents an assumed number of cheated secret information shares which satisfies prescribed condition associated with a threshold value k; and
  a recovering apparatus including a processor and a non-transitory computer-readable medium storing a program executable by the processor and that performs the Reed-Solomon error-correcting process on the arbitrary k secret information shares V{i_j} (j=1, 2, . . . , k) of the secret information shares generated by said shared information generating apparatus and k cheater identifying information Ai{i_j} (j=1, 2, . . . , k) corresponding thereto, determines whether each of said secret information shares V{i_j} is a cheated secret information share or not, and recovers said secret information from the k secret information shares V{i_j} if no cheated secret information share is detected,
wherein said shared information generating apparatus comprises:
  a secret information sharing device that is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and
  a cheater identifying information generating device that is supplied with said n secret information shares Vi output from said secret information sharing device, generates values xi which are uniquely determined from the secret information shares Vi according to a process h which assures that h(Vi)≠h(Vj) is satisfied if Vi≠Vj where vi, vj represent arbitrary values, and outputs C(xi) (i=1, 2, . . . , n) produced by assigning the generated values xi to random t-th polynomials C, as cheater identifying information Ai corresponding to the secret information shares Vi; and
wherein said recovering apparatus comprises:
  a cheater identifying device that detects errors according to the Reed-Solomon error-correcting process and decodes said t-th polynomials C, by using the k secret information shares V{i_j} (j=1, 2, . . . , k) of the secret information shares generated by said secret information sharing device and the k cheater identifying information Ai{i_j} (j=1, 2, . . . , k) generated by said cheater identifying information generating device and corresponding to the k secret information shares {i_j}; and
  a secret information recovering device that recovers said secret information by using the k secret information shares V{i_j} (j=1, 2, . . . , k) if said cheater identifying device detects no errors.

2. The secret information sharing system according to claim 1, further comprising:
  n memory devices that store n pairs of the secret information shares Vi(i=1, 2, . . . , n) and the cheater identifying information Ai(i=1, 2, . . . , n) which are generated by said shared information generating apparatus.

3. A secret information sharing system for splitting secret information into a plurality of secret information shares according to a (k,n)-threshold secret sharing scheme and managing the secret information shares, comprising:

a shared information generating apparatus including a processor and a non-transitory computer-readable medium storing a program executable by the processor and that generates n secret information shares Vi(i=1, 2, ..., n) from said secret information according to the (k,n)-threshold secret sharing scheme, and generates cheater identifying information Ai(i=1, 2, ..., n), which makes it possible to detect and correct the errors according to a Reed-Solomon error-correcting process if t or less secret information shares of arbitrary k secret information shares V{i_j} (j=1, 2, ..., k) have errors, in association with said n secret information shares Vi, using the generated n secret information shares Vi and random t-th polynomials where t represents an assumed number of cheated secret information shares which satisfies prescribed condition associated with a threshold value k; and a recovering apparatus including a processor and a non-transitory computer-readable medium storing a program executable by the processor and that performs the Reed-Solomon error-correcting process on the arbitrary k secret information shares V{i_j} (j=1, 2, ..., k) of the secret information shares generated by said shared information generating apparatus and k cheater identifying information Ai{i_j} (j=1, 2, ..., k) corresponding thereto, determines whether each of said secret information shares V{i_j} is a cheated secret information share or not, and recovers said secret information from the k secret information shares V{i_j} if no cheated secret information share is detected, wherein said shared information generating apparatus comprises:

a secret information sharing device that is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and a cheater identifying information generating device that is supplied with said n secret information shares Vi output from said secret information sharing device, generates values xi which are uniquely determined from the secret information shares Vi and randomly generated e according to a process h which assures that the probability that h(Vi)≠h(Vj) is satisfied if Vi≠Vj where vi, vj represent arbitrary values is equal to or higher than a predetermined level, and outputs Cs(xi)(i=1, 2, ..., n) produced by assigning the generated values xi to random t-th polynomials Cs and Ce(i)(i=1, 2, ..., n) produced by inputting i to random t-th polynomials Ce which represent Ce(0)=e with respect to said e, as cheater identifying information Ai corresponding to the secret information shares Vi; and wherein said recovering apparatus comprises:

a cheater identifying device that detects errors according to the Reed-Solomon error-correcting process and decodes said t-th polynomials Cs, Ce, by using the k secret information shares V{i_j} (j=1, 2, ..., k) of the secret information shares generated by said secret information sharing device and the k cheater identifying information Ai{i_j} (j=1, 2, ..., k) generated by said cheater identifying information generating device and corresponding to the k secret information shares V{i_j}; and a secret information recovering device that recovers said secret information by using the k secret information shares V{i_j} (j=1, 2, ..., k) if said cheater identifying device detects no errors.

4. A shared information generating apparatus for splitting secret information into a plurality of secret information shares according to a (k,n)-threshold secret sharing scheme, comprising:

a secret information sharing device including a processor and a non-transitory computer-readable medium storing a program executable by the processor and that generates n secret information shares Vi(i=1, 2, ..., n) from said secret information according to the (k,n)-threshold secret sharing scheme; and a cheater identifying information generating device including a processor and a non-transitory computer-readable medium storing a program executable by the processor and that generates cheater identifying information Ai(i=1, 2, ..., n), which makes it possible to detect and correct the errors according to a Reed-Solomon error-correcting process if t or less secret information shares of arbitrary k secret information in association with said n secret information shares Vi, by using the n secret information shares Vi generated by said secret information sharing device and random t-th polynomials where t represents a value which satisfies prescribed condition associated with a threshold value k, wherein said secret information sharing device is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and said cheater identifying information generating device is supplied with said n secret information shares Vi output from said secret information sharing device, generates values xi which are uniquely determined from the secret information shares Vi according to a process h which assures that h(Vi)≠h(Vj) is satisfied if Vi≠Vj where vi, vj represent arbitrary values, and outputs C(xi) (i=1, 2, ..., n) produced by assigning the generated values xi to random t-th polynomials C, as cheater identifying information Ai corresponding to the secret information shares Vi.

5. A shared information generating apparatus for splitting secret information into a plurality of secret information shares according to a (k,n)-threshold secret sharing scheme, comprising:

a secret information sharing device including a processor and a non-transitory computer-readable medium storing a program executable by the processor and that generates n secret information shares Vi(i=1, 2, ..., n) from said secret information according to the (k,n)-threshold secret sharing scheme; and a cheater identifying information generating device including a processor and a non-transitory computer-readable medium storing a program executable by the processor and that generates cheater identifying information Ai(i=1, 2, ..., n), which makes it possible to detect and correct the errors according to a Reed-Solomon error-correcting process if t or less secret information shares of arbitrary k secret information shares V{i_j} (j=1, 2, ..., k) have errors, in association with said n secret information shares Vi, by using the n secret information shares Vi generated by said secret information sharing device and random t-th polynomials where t represents a value which satisfies prescribed condition associated with a threshold value k, wherein said secret information sharing device is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and said cheater identifying information generating device is supplied with said n secret information shares Vi output from said secret information sharing device, generates values xi which are uniquely determined from the secret information shares Vi and randomly generated e according to a process h which assures that the probability that $h(Vi) \neq h(Vj)$ is satisfied if $Vi \neq Vj$ where vi, vj represent arbitrary values is equal to or higher than a predetermined level, and outputs $Cs(xi)$ ($i=1, 2, \ldots, n$) produced by assigning the generated values xi to random t-th polynomials Cs and $Ce(i)(i=1, 2, \ldots, n)$ produced by inputting i to random t-th polynomials Ce which represent $Ce(0)=e$ with respect to said e, as cheater identifying information Ai corresponding to the secret information shares Vi.

6. A recovering apparatus for recovering secret information from a plurality of secret information shares generated according to a (k,n)-threshold secret sharing scheme by a shared information generating apparatus for splitting secret information into a plurality of secret information shares according to a (k,n)-threshold secret sharing scheme, comprising: a secret information sharing device that generates n secret information shares $Vi(i=1, 2, \ldots, n)$ from said secret information according to the (k,n)-threshold secret sharing scheme; and a cheater identifying information generating device that generates cheater identifying information $Ai(i=1, 2, \ldots, n)$, which makes it possible to detect and correct the errors according to a Reed-Solomon error-correcting process if t or less secret information shares of arbitrary k secret information shares $V\{i\_j\}$ ($j=1, 2, \ldots, k$) have errors, in association with said n secret information shares Vi, by using the n secret information shares Vi generated by said secret information sharing device and random t-th polynomials where t represents a value which satisfies prescribed condition associated with a threshold value k, comprising:

a cheater identifying device including a processor and a non-transitory computer-readable medium storing a program executable by the processor and that performs a Reed-Solomon error-correcting process on arbitrary k secret information shares $V\{i\_j\}$ ($j=1, 2, \ldots, k$) of the secret information shares generated by said shared information generating apparatus and k cheater identifying information $Ai\{i\_j\}$ ($j=1, 2, \ldots, k$) corresponding thereto; and a secret information recovering device including a processor and a non-transitory computer-readable medium storing a program executable by the processor and that recovers said secret information from the k secret information shares $V\{i\_j\}$ if said cheater identifying device detects no errors, wherein said shared information generating apparatus that said secret information sharing device is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and said cheater identifying information generating device is supplied with said n secret information shares Vi output from said secret information sharing device, generates values xi which are uniquely determined from the secret information shares Vi according to a process h which assures that $h(Vi) \neq h(Vj)$ is satisfied if $Vi \neq Vj$ where vi, vj represent arbitrary values, and outputs $C(xi)(i=1, 2, \ldots, n)$ produced by assigning the generated values xi to random t-th polynomials C, as cheater identifying information Ai corresponding to the secret information shares Vi, said cheater identifying device detects errors according to the Reed-Solomon error-correcting process and decodes said t-th polynomials C, using the k secret information shares $V\{i\_j\}$ ($j=1, 2, \ldots, k$) of the secret information shares generated by said secret information sharing device and the k cheater identifying information $Ai\{i\_j\}$ ($j=1, 2, \ldots, k$) generated by said cheater identifying information generating device and corresponding to the k secret information shares $\{i\_j\}$; and said secret information recovering device recovers said secret information using the k cheater identifying information $Ai\{i\_j\}$ ($j=1, 2, \ldots, k$) if said cheater identifying device detects no errors.

7. A recovering apparatus for recovering secret information from a plurality of secret information shares generated according to a (k,n)-threshold secret sharing scheme by a shared information generating apparatus for splitting secret information into a plurality of secret information shares according to a (k,n)-threshold secret sharing scheme, comprising: a secret information sharing device that generates n secret information shares $Vi(i=1, 2, \ldots, n)$ from said secret information according to the (k,n)-threshold secret sharing scheme; and a cheater identifying information generating device that generates cheater identifying information $Ai(i=1, 2, \ldots, n)$, which makes it possible to detect and correct the errors according to a Reed-Solomon error-correcting process if t or less secret information shares of arbitrary k secret information shares $V\{i\_j\}$ ($j=1, 2, \ldots, k$) have errors, in association with said n secret information shares Vi, by using the n secret information shares Vi generated by said secret information sharing device and random t-th polynomials where t represents a value which satisfies prescribed condition associated with a threshold value k, comprising:

a cheater identifying device including a processor and a non-transitory computer-readable medium storing a program executable by the processor and that performs a Reed-Solomon error-correcting process on arbitrary k secret information shares $V\{i\_j\}$ ($j=1, 2, \ldots, k$) of the secret information shares generated by said shared information generating apparatus and k cheater identifying information $Ai\{i\_j\}$ ($j=1, 2, \ldots, k$) corresponding thereto; and a secret information recovering device including a processor and a non-transitory computer-readable medium storing a program executable by the processor and that recovers said secret information from the k secret information shares $V\{i\_j\}$ if said cheater identifying device detects no errors, wherein said shared information generating apparatus that said secret information sharing device is supplied with said secret information, said threshold value k, a total number n of secret information shares, and an assumed number t of cheated secret information shares, and outputs said n secret information shares Vi which allow said secret information to be uniquely recovered from said arbitrary k secret information shares; and said cheater identifying information generating device is supplied with said n secret information shares Vi output from said secret information sharing device, generates values xi which are uniquely determined from the secret information shares Vi and randomly generated e according to a process h which assures that the probability that h(Vi)≠h(Vj) is satisfied if Vi≠Vj where vi, vj represent arbitrary values is equal to or higher than a predetermined level, and outputs Cs(xi)(i=1, 2, . . . , n) produced by assigning the generated values xi to random t-th polynomials Cs and Ce(i)(i=1, 2, . . . , n) produced by inputting i to random t-th polynomials Ce which represent Ce(0)=e with respect to said e, as cheater identifying information Ai corresponding to the secret information shares Vi;

said cheater identifying device detects errors according to the Reed-Solomon error-correcting process and decodes said t-th polynomials Cs, Ce, using the k secret information shares V{i_j} (j=1, 2, . . . , k) of the secret information shares generated by said secret information sharing device and the k cheater identifying information Ai{i_j} (j=1, 2, . . . , k) generated by said cheater identifying information generating device and corresponding to the k secret information shares V{i_j}; and said cheater information recovering device recovers said secret information using the k cheater identifying information Ai{i_j} (j=1, 2, . . . , k) if said cheater identifying device detects no errors.

8. A secret information sharing system for splitting secret information into a plurality of secret information shares according to a (k,n)-threshold secret sharing scheme and managing the secret information shares, comprising:

a shared information generating apparatus including a processor and a non-transitory computer-readable medium storing a program executable by the processor and that generates n secret information shares Vi(i=1, 2, . . . , n) from said secret information according to the (k,n)-threshold secret sharing scheme, and generates cheater identifying information Ai(i=1, 2, . . . , n) corresponding to the n secret information shares Vi by using values produced by predetermined check condition equations as the cheater identifying information Ai corresponding to the secret information shares Vi, using the generated n secret information shares Vi, random data, and random (t−1)th polynomials where t represents an assumed number of cheated secret information shares which satisfies prescribed condition associated with a threshold value k; and a recovering apparatus including a processor and a non-transitory computer-readable medium storing a program executable by the processor and that determines whether the check condition equations are satisfied or not using arbitrary k secret information shares V{i_j} (j=1, 2, . . . , k) of the secret information shares generated by said shared information generating apparatus and k cheater identifying information Ai{i_j} (j=1, 2, . . . , k) corresponding thereto, determines whether each of the k secret information shares V{i_j} is a cheated secret information share or not based on the determined result as to whether the check condition equations are satisfied or not, and recovers said secret information from the k secret information shares V{i_j} if all the k secret information shares V{i_j} are not cheated secret information shares, wherein said shared information generating apparatus comprises:

a secret information sharing device that is supplied with said secret information, said threshold value k, a total number n of secret information shares, and an assumed number t of cheated secret information shares, and outputs said n secret information shares Vi=(i, vi) (i=1, 2, . . . , n) which allow said secret information to be uniquely recovered from said arbitrary k secret information shares; and a cheater identifying information generating device that is supplied with said n secret information shares Vi(i=1, 2, . . . , n) output from said secret information sharing device, generates a{i,j} as the check condition equations a{i,j}=e{0,j}*vi+e{1,j}(i)(j=1, 2, . . . , n, j≠i) where said random data are represented by e{0,j} and said (t−1)th polynomials by e{1,i}(x)(i=1, 2, . . . , n), and determines (e{0,i}, e{1,i}, a{i,1}, a{i,2}, . . . , a{i,i−1}, a{i,i+1}, . . . , a{i,n})(i=1, 2, . . . , n) as cheater identifying information Ai with respect to Vi; and wherein said recovering apparatus comprises:

a cheater identifying device that determines whether said check condition equations a{i,j}=e{0,j}*vi+e{1,j}(i) are satisfied or not with respect to a combination of i, j(i, j=1, 2, . . . , n, i≠j), by using the k secret information shares V{i_j} (j=1, 2, . . . , k) of the secret information shares generated by said secret information sharing device and the k cheater identifying information Ai{i_j} (j=1, 2, . . . , k) generated by said cheater identifying information generating device and corresponding to the k secret information shares {i_j}, and determines whether each of the k secret information shares V{i_j} (j=1, 2, . . . , k) is a cheated secret information share or not based on the determined result about whether said check condition equations a{i,j} are satisfied or not; and a secret information recovering device that recovers said secret information from the k secret information shares Vi if said cheater identifying device judges that all the k secret information shares V{i_j} (j=1, 2, . . . , k) are not cheated secret information shares.

9. The secret information sharing system according to claim 8, further comprising:

n memory devices that store n pairs of the secret information shares Vi(i=1, 2, . . . , n) and the cheater identifying information Ai(i=1, 2, . . . , n) which are generated by said shared information generating apparatus.

10. A secret information sharing system for splitting secret information into a plurality of secret information shares according to a (k,n)-threshold secret sharing scheme and managing the secret information shares, comprising:

a shared information generating apparatus including a processor and a non-transitory computer-readable medium storing a program executable by the processor and that generates n secret information shares Vi(i=1, 2, . . . , n) from said secret information according to the (k,n)-threshold secret sharing scheme, and generates cheater identifying information Ai(i=1, 2, . . . , n) corresponding to the n secret information shares Vi by using values produced by predetermined check condition equations as the cheater identifying information Ai corresponding to the secret information shares Vi, using the generated n secret information shares Vi, random data, and random (t−1)th polynomials where t represents an assumed number of cheated secret information shares which satisfies prescribed condition associated with a threshold value k; and a recovering apparatus including a processor and a non-transitory computer-readable medium storing a program executable by the processor and that determines whether the check condition equations are satisfied or not using arbitrary k secret information shares $V\{i\_j\}$ (j=1, 2, ..., k) of the secret information shares generated by said shared information generating apparatus and k cheater identifying information $Ai\{i\_j\}$ (j=1, 2, ..., k) corresponding thereto, determines whether each of the k secret information shares $V\{i\_j\}$ is a cheated secret information share or not based on the determined result as to whether the check condition equations are satisfied or not, and recovers said secret information from the k secret information shares $V\{i\_j\}$ if all the k secret information shares $V\{i\_j\}$ are not cheated secret information shares, wherein said shared information generating apparatus comprises:

a secret information sharing device that is supplied with said secret information, said threshold value k, a total number n of secret information shares, and an assumed number t of cheated secret information shares, and outputs said n secret information shares $Vi=(i, v\{i,1\}, v\{i,2\}, \ldots, v\{i,N\})(v\{i,m\} \in GF(q))(i=1, 2, \ldots, n)$ which allow said secret information to be uniquely recovered from said arbitrary k secret information shares; and a cheater identifying information generating device that is supplied with $Vi(i=1, 2, \ldots, n)$ output from said secret information sharing device, generates a $\{i,j\}$ as the check condition equations $a\{i,j\}=e\{0,j\}*v\{i,1\}+e\{0,j\}^2*v\{i,2\}+\ldots+e\{0,j\}^N*v\{i,N\}+e\{i,j\}(i)(j=1, 2, \ldots, n, j \neq i)$ where said random data are represented by $e\{0,i\} \in GF(q)$ and said (t−1)th polynomials by random (t−1)th polynomials $e\{1,i\}(x)(i=1, 2, \ldots, n)$, and determines $(e\{0,i\}, e\{1,i\}, a\{i,1\}, a\{i,2\}, \ldots, a\{i,i-1\}, a\{i,i+1\}, \ldots, a\{i,n\})(i=1, 2, \ldots, n)$ as cheater identifying information with respect to Vi; and wherein said recovering apparatus comprises:

a cheater identifying device that determines whether said check condition equations $a\{i,j\}=e\{0,j\}*v\{i,1\}+e\{0,j\}^2*v\{i,2\}+\ldots+e\{0,j\}^N*v\{i,N\}+e\{i,j\}(i)$ are satisfied or not with respect to a combination of i, j(i, j=1, 2, ..., n, i≠j), by using the k secret information shares $V\{i\_j\}$ (j=1, 2, ..., k) of the secret information shares generated by said secret information sharing device and the k cheater identifying information $Ai\{i\_j\}$ (j=1, 2, ..., k) generated by said cheater identifying information generating device and corresponding to the k secret information shares $\{i\_j\}$, and determines whether each of the k secret information shares $V\{i\_j\}$ (j=1, 2, ..., k) is a cheated secret information share or not based on the determined result about whether said check condition equations $a\{i,j\}$ are satisfied or not; and a secret information recovering device that recovers said secret information from the k secret information shares Vi if said cheater identifying device judges that all the k secret information shares $V\{i\_j\}$ (j=1, 2, ..., k) are not cheated secret information shares.

11. A shared information generating apparatus for splitting secret information into a plurality of secret information shares according to a (k,n)-threshold secret sharing scheme, comprising:

a secret information sharing device including a processor and a non-transitory computer-readable medium storing a program executable by the processor and that generates n secret information shares $Vi(i=1, 2, \ldots, n)$ from said secret information according to the (k,n)-threshold secret sharing scheme; and a cheater identifying information generating device including a processor and a non-transitory computer-readable medium storing a program executable by the processor and that generates cheater identifying information $Ai(i=1, 2, \ldots, n)$ corresponding to the n secret information shares Vi by using values produced by predetermined check condition equations as the cheater identifying information Ai corresponding to the secret information shares Vi, using the n secret information shares Vi generated by said secret information sharing device, random data, and random (t−1)th polynomials where t represents an assumed number of cheated secret information shares which satisfies prescribed condition associated with a threshold value k, wherein said secret information sharing device is supplied with said secret information, said threshold value k, a total number n of secret information shares, and an assumed number t of cheated secret information shares, and outputs said n secret information shares $Vi=(i, vi)$ $(i=1, 2, \ldots, n)$ which allow said secret information to be uniquely recovered from said arbitrary k secret information shares; and wherein said cheater identifying information generating device is supplied with said n secret information shares $Vi(i=1, 2, \ldots, n)$ output from said secret information sharing device, generates a$\{i,j\}$ as the check condition equations $a\{i,j\}=e\{0,j\}*vi+e\{1,j\}(i)(j=1, 2, \ldots, n, j \neq i)$ where said random data are represented by $e\{0,j\}$ and said (t−1)th polynomials by $e\{1,i\}(x)(i=1, 2, \ldots, n)$, and determines $(e\{0,i\}, e\{1,i\}, a\{i,1\}, a\{i,2\}, \ldots, a\{i,i-1\}, a\{i,i+1\}, \ldots, a\{i,n\})(i=1, 2, \ldots, n)$ as cheater identifying information Ai with respect to Vi.

12. A shared information generating apparatus for splitting secret information into a plurality of secret information shares according to a (k,n)-threshold secret sharing scheme, comprising:

a secret information sharing device including a processor and a non-transitory computer-readable medium storing a program executable by the processor and that generates n secret information shares $Vi(i=1, 2, \ldots, n)$ from said secret information according to the (k,n)-threshold secret sharing scheme; and a cheater identifying information generating device including a processor and a non-transitory computer-readable medium storing a program executable by the processor and that generates cheater identifying information $Ai(i=1, 2, \ldots, n)$ corresponding to the n secret information shares Vi by using values produced by predetermined check condition equations as the cheater identifying information Ai corresponding to the secret information shares Vi, using the n secret information shares Vi generated by said secret information sharing device, random data, and random (t−1)th polynomials where t represents an assumed number of cheated secret information shares which satisfies prescribed condition associated with a threshold value k, wherein said secret information sharing device is supplied with said secret information, said threshold value k, a total number n of secret information shares, and an assumed number t of cheated secret information shares, and outputs said n secret information shares $Vi=(i, v\{i,1\}, v\{i,2\}, \ldots, v\{i,N\})(v\{i,m\} \in GF(q))$ $(i=1, 2, \ldots, n)$ which allow said secret information to be uniquely recovered from said arbitrary k secret information shares; and wherein said cheater identifying information generating device is supplied with $Vi(i=1, 2, \ldots, n)$ output from said secret information sharing device, generates a$\{i,j\}$ as the check condition equations $a\{i,j\}=e\{0,j\}*v\{i,1\}+e\{0,$ $j\}^2*v\{i,2\}+ \ldots +e\{0,j\}^N*v\{i,N\}+e\{i,j\}(i)$ (j=1, 2, ..., n, j≠i) where said random data are represented by $e\{0,i\} \in GF(q)$ and said (t−1)th polynomials by random (t−1)th polynomials $e\{1,i\}(x)$ (i=1, 2, ..., n), and determines $(e\{0,i\}, e\{1,i\}, a\{i,1\}, a\{i,2\}, \ldots, a\{i,i-1\}, a\{i,i+1\}, \ldots, a\{i,n\})$ (i=1, 2, ..., n) as cheater identifying information with respect to Vi.

13. A recovering apparatus for recovering secret information from a plurality of secret information shares generated according to a (k,n)-threshold secret sharing scheme by a shared information generating apparatus for splitting secret information into a plurality of secret information shares according to a (k,n)-threshold secret sharing scheme, comprising: a secret information sharing device that generates n secret information shares Vi(i=1, 2, ..., n) from said secret information according to the (k,n)-threshold secret sharing scheme; and a cheater identifying information generating device that generates cheater identifying information Ai(i=1, 2, ..., n) corresponding to the n secret information shares Vi by using values produced by predetermined check condition equations as the cheater identifying information Ai corresponding to the secret information shares Vi, using the n secret information shares Vi generated by said secret information sharing device, random data, and random (t−1)th polynomials where t represents an assumed number of cheated secret information shares which satisfies prescribed condition associated with a threshold value k, comprising:

a cheater identifying device including a processor and a non-transitory computer-readable medium storing a program executable by the processor and that determines whether the check condition equations are satisfied or not using arbitrary k secret information shares $V\{i\_j\}$ (j=1, 2, ..., k) of the secret information shares generated by said shared information generating apparatus and k cheater identifying information $Ai\{i\_j\}$ (j=1, 2, ..., k) corresponding thereto, and determines whether each of the k secret information shares $V\{i\_j\}$ is a cheated secret information share or not based on the determined result as to whether the check condition equations are satisfied or not; and a secret information recovering device including a processor and a non-transitory computer-readable medium storing a program executable by the processor and that recovers said secret information from the k secret information shares $V\{i\_j\}$ if all the k secret information shares $V\{i\_j\}$ are not cheated secret information shares, wherein said shared information generating apparatus that said secret information sharing device is supplied with said secret information, said threshold value k, a total number n of secret information shares, and an assumed number t of cheated secret information shares, and outputs said n secret information shares Vi=(i, vi) (i=1, 2, ..., n) which allow said secret information to be uniquely recovered from said arbitrary k secret information shares; and that said cheater identifying information generating device is supplied with said n secret information shares Vi(i=1, 2, ..., n) output from said secret information sharing device, generates $a\{i,j\}$ as the check condition equations $a\{i,j\}=e\{0,j\}*vi+e\{1,j\}(i)$ (j=1, 2, ..., n, j≠i) where said random data are represented by $e\{0,j\}$ and said (t−1)th polynomials by $e\{1,i\}(x)$ (i=1, 2, ..., n), and determines $(e\{0,i\}, e\{1,i\}, a\{i,1\}, a\{i,2\}, \ldots, a\{i,i-1\}, a\{i,i+1\}, \ldots, a\{i,n\})$ (i=1, 2, ..., n) as cheater identifying information Ai with respect to Vi;

said cheater identifying device determines whether said check condition equations $a\{i,j\}=e\{0,j\}*vi+e\{1,j\}(i)$ are satisfied or not with respect to a combination of i, j(i, j=1, 2, ..., n, i≠j), using the k secret information shares $V\{i\_j\}$ (j=1, 2, ..., k) of the secret information shares generated by said secret information sharing device and the k cheater identifying information $Ai\{i\_j\}$ (j=1, 2, ..., k) generated by said cheater identifying information generating device and corresponding to the k secret information shares $\{i\_j\}$, and determines whether each of the k secret information shares $V\{i\_j\}$ (j=1, 2, ..., k) is a cheated secret information share or not based on the determined result about whether said check condition equations $a\{i,j\}$ are satisfied or not; and said secret information recovering device recovers said secret information from the k secret information shares Vi if said cheater identifying device judges that all the k secret information shares $V\{i\_j\}$ (j=1, 2, ..., k) are not cheated secret information shares.

14. A recovering apparatus for recovering secret information from a plurality of secret information shares generated according to a (k,n)-threshold secret sharing scheme by a shared information generating apparatus for splitting secret information into a plurality of secret information shares according to a (k,n)-threshold secret sharing scheme, comprising: a secret information sharing device that generates n secret information shares Vi(i=1, 2, ..., n) from said secret information according to the (k,n)-threshold secret sharing scheme; and a cheater identifying information generating device that generates cheater identifying information Ai(i=1, 2, ..., n) corresponding to the n secret information shares Vi by using values produced by predetermined check condition equations as the cheater identifying information Ai corresponding to the secret information shares Vi, using the n secret information shares Vi generated by said secret information sharing device, random data, and random (t−1)th polynomials where t represents an assumed number of cheated secret information shares which satisfies prescribed condition associated with a threshold value k, comprising:

a cheater identifying device including a processor and a non-transitory computer-readable medium storing a program executable by the processor and that determines whether the check condition equations are satisfied or not using arbitrary k secret information shares $V\{i\_j\}$ (j=1, 2, ..., k) of the secret information shares generated by said shared information generating apparatus and k cheater identifying information $Ai\{i\_j\}$ (j=1, 2, ..., k) corresponding thereto, and determines whether each of the k secret information shares $V\{i\_j\}$ is a cheated secret information share or not based on the determined result as to whether the check condition equations are satisfied or not; and a secret information recovering device including a processor and a non-transitory computer-readable medium storing a program executable by the processor and that recovers said secret information from the k secret information shares $V\{i\_j\}$ if all the k secret information shares $V\{i\_j\}$ are not cheated secret information shares, wherein said shared information generating apparatus that said secret information sharing device is supplied with said secret information, said threshold value k, a total number n of secret information shares, and an assumed number t of cheated secret information shares, and outputs said n secret information shares Vi=(i, $v\{i,1\}$, $v\{i,2\}$, ..., $v\{i,N\}$) ($v\{i,m\} \in GF(q)$) (i=1, 2, ..., n) which allow said secret information to be uniquely recovered from said arbitrary k secret information shares; and that said cheater identifying information generating device is supplied with Vi(i=1, 2, ..., n) output from said secret information sharing device, generates $a\{i,j\}$ as the check condition equations $a\{i,j\}=e\{0,j\}*v\{i,1\}+e\{0,j\}^2*v\{i,2\}+\ldots+e\{0,j\}^N*v\{i,N\}+e\{i,j\}(i)$ $(j=1, 2, \ldots, n, j\neq i)$ where said random data are represented by $e\{0,i\}\in GF(q)$ and said $(t-1)$th polynomials by random $(t-1)$th polynomials $e\{1,i\}(x)$ $(i=1, 2, \ldots, n)$, and determines $(e\{0,i\}, e\{1,i\}, a\{i,1\}, a\{i,2\}, \ldots, a\{i,i-1\}, a\{i,i+1\}, \ldots, a\{i,n\})$ $(i=1, 2, \ldots, n)$ as cheater identifying information with respect to Vi;

said cheater identifying device determines whether said check condition equations $a\{i,j\}=e\{0,j\}*v\{i,1\}+e\{0,j\}^2*v\{i,2\}+\ldots+e\{0,j\}^N*v\{i,N\}+e\{i,j\}(i)$ are satisfied or not with respect to a combination of i, j(i, j=1, 2, \ldots, n, i\neq j), using the k secret information shares $V\{i\_j\}$ (j=1, 2, \ldots, k) of the secret information shares generated by said secret information sharing device and the k cheater identifying information $Ai\{i\_j\}$ (j=1, 2, \ldots, k) generated by said cheater identifying information generating device and corresponding to the k secret information shares $\{i\_j\}$, and determines whether each of the k secret information shares $V\{i\_j\}$ (j=1, 2, \ldots, k) is a cheated secret information share or not based on the determined result about whether said check condition equations $a\{i,j\}$ are satisfied or not; and said secret information recovering device recovers said secret information from the k secret information shares Vi if said cheater identifying device judges that all the k secret information shares $V\{i\_j\}$ (j=1, 2, \ldots, k) are not cheated secret information shares.

* * * * *